United States Patent
Westberg et al.

(10) Patent No.: US 11,425,173 B2
(45) Date of Patent: Aug. 23, 2022

(54) METHODS AND NODES SUPPORTING LAWFUL INTERCEPT

(71) Applicant: Telefonaktiebolaget LM Ericsson (publ), Stockholm (SE)

(72) Inventors: Lars Westberg, Enköping (SE); Erik Friman, Stockholm (SE); Jari Vikberg, Järna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 676 days.

(21) Appl. No.: 15/118,632

(22) PCT Filed: Feb. 14, 2014

(86) PCT No.: PCT/SE2014/050187
§ 371 (c)(1),
(2) Date: Aug. 12, 2016

(87) PCT Pub. No.: WO2015/122816
PCT Pub. Date: Aug. 20, 2015

(65) Prior Publication Data
US 2017/0063937 A1 Mar. 2, 2017

(51) Int. Cl.
*H04L 29/06* (2006.01)
*H04M 3/22* (2006.01)
*H04W 12/02* (2009.01)
*H04L 9/40* (2022.01)
*H04W 12/75* (2021.01)

(52) U.S. Cl.
CPC ........ *H04L 63/306* (2013.01); *H04M 3/2281* (2013.01); *H04W 12/02* (2013.01); *H04W 12/75* (2021.01)

(58) Field of Classification Search
CPC .... H04L 63/306; H04W 12/02; H04M 3/2281
See application file for complete search history.

(56) References Cited

U.S. PATENT DOCUMENTS

| | | | |
|---|---|---|---|
| 6,438,695 B1 * | 8/2002 | Maufer | H04L 63/0272 379/35 |
| 9,537,970 B2 * | 1/2017 | Bhogal | G06F 9/542 |
| 2007/0162971 A1 * | 7/2007 | Blom | H04L 63/10 726/17 |
| 2008/0091805 A1 * | 4/2008 | Malaby | H04L 67/1097 709/223 |
| 2011/0013631 A1 * | 1/2011 | Frydman | H04L 12/1827 370/390 |

FOREIGN PATENT DOCUMENTS

| | | | | |
|---|---|---|---|---|
| EP | 2152032 | * | 2/2010 | ............ H04W 12/02 |
| WO | 2008082329 A1 | | 7/2008 | |

OTHER PUBLICATIONS

International Search Report and Written Opinion dated Nov. 13, 2014 in International application No. PCT/SE2014/050187, 8 pages.

* cited by examiner

*Primary Examiner* — Muthuswamy G Manoharan
(74) *Attorney, Agent, or Firm* — Rothwell, Figg, Ernst & Manbeck, P.C.

(57) ABSTRACT

The present invention relates to methods, systems, LI systems and nodes in a telecommunication network for providing bandwidth optimization by means of a tokenizer functionality and a restore functionality. It is further provided a token-content-synch process for synchronizing the tokenizer functionality and the restore functionality.

23 Claims, 15 Drawing Sheets

METHODS AND NODES SUPPORTING LAWFUL INTERCEPT

CROSS-REFERENCE TO RELATED APPLICATIONS

This application is a 35 U.S.C. § 371 National Phase Entry Application from PCT/SE2014/050187, filed Feb. 14, 2014, and designating the United States.

TECHNICAL FIELD

The present technology relates to bandwidth optimization and Lawful Intercept solutions in mobile networks. The present technology relates more specifically to methods, systems, Lawful Intercept systems and nodes in a telecommunication network for minimizing bandwidth usage and to enable Lawful Intercept.

BACKGROUND

Bandwidth optimization solutions are based on compression of content. One principle is based on having a main content server high up in the network hierarchy, e.g. at the (S)Gi interface. When any content is sent to a user equipment, UE, from the main content server, the content is compressed in a SGW of a mobile network while being transported from the main content server to a node in a Radio Access Network, RAN. One such compression is based on transporting a token instead of the original content and this can be initiated by a tokenization function placed in the SGW between the main content server and the RAN node. The RAN node contains a restore function that is synchronized by sending the full content item and the token from the tokenization function to the restore function can restore the original content based on the token before it is transported to the UE.

According to lawful interception (LI), all signalling and data delivered to an end user under LI needs to be collected. One condition under LI is that LI activity should not be able to be detected by the end user under LI or other people.

One problem arises when data delivered to an end user or used by the end user passes a site comprising an IAP as a token. Any LI is not possible in this situation.

FIG. 1 shows the 3GPP standardized interfaces for LI in the packet domain.

FIG. 1 is a block diagram of an exemplary Lawful Interception (LI) system 110 and network 10 according to prior art. Said system and network comprises a number of entities. The exemplary LI system comprises a Law Enforcement Management Function, LEMF, 12 for requesting LI services of the LI system and collecting the intercepted information of Intercepting Access Points, IAPs, 20 in the system. The system shall provide access to the intercepted Content of Communications, CC, and Intercept Related Information, IRI, of a target and services related to the target on behalf of one or more Law Enforcement Agencies, LEAs 80. A target is a person of interest and/or user equipment possessed or used by the person of interest being surveyed by the LEA. An intercept request, also denoted Request for LI activation, is sent through a first Handover Interface, HI1, located between the Law Enforcement Management Function 12 and an Intercept Mediation and Delivery Unit, IMDU, 14 comprising a Mediation Function, MF, 16 and an Administration Function, ADMF, 18. Said Mediation Function 16 and Administration Function 18 generate based on said received request a warrant comprising said one or more target identities, and sends said warrant towards an Intercept Control Element, ICE, in an Interception Access Point, IAP, 20 via an interface denoted X1_1. The IAP 20 may be connected to a node of a network, e.g. the Internet, a 3GMS (third generation Mobile Communications System), an Evolved Packet System (EPS) etc., from which it intercepts said Content of Communications and Intercept Related Information of a mobile target. Said CC and IRI are network related data. As reference to the standard model, see references [1], [2] and [3], the content of communication is intercepted in the IAP network node and it is based upon duplication of target communication payload without modification. The IAP sends IRI raw data via an interface X2 to a Delivery Function for IRI reporting, DF2, 22 and a Mediation Function of IRI, MF2, 24 that generates and delivers to a collection functionality a standardized IRI report based on the received IRI report. Said standardized IRI report is sent over a standardized interface HI2 to the LEMF 12. The IAP 20 also sends CC raw data via an interface X3 to a Delivery Function for CC reporting, DF3, 26 and a Mediation Function of IRI, MF3, 28 which generates and delivers to a collection functionality a standardized CC report based on the received CC report. Said standardized CC report is sent over a standardized interface HI3 to the requesting LEMF 12.

Together with the delivery functions it is used to hide from the Intercepting Access Point IAP entities that there might be multiple activations by different Lawful Enforcement Agencies on the same target.

The HI2 and HI3-interfaces represent the interfaces between the LEA and two delivery functions. The delivery functions are used:
  to distribute the Intercept Related Information (IRI) to the relevant LEA(s) via HI2;
  to distribute the Content of Communication (CC) to the relevant LEA(s) via HI3.

In reference [3], the interfaces HI1, HI2 and HI3 are specified in more detail.

According to known internet access services, all the IP streams related to a given target is intercepted and delivered as a whole session data flow regardless any service used within an interception session.

In the example in FIG. 1, the IAP 20 is connected to, or contained within a user plane gateway, PGW, in a node 140 in a CN 115. The IAP may be connected to any type of user plane gateway, e.g. SGW, PGW and GGSN. The same interfaces are also used for control plane nodes like MME and HLR/HSS. Streams of content flow through the user plane gateway in both directions to the UE and from the UE. In one direction, content may come from any site within the CN or any site 119 in a connected communications network 117, e.g. LAN, WLAN, WAN, RAN, etc. The flow passes the (S)Gi interface connected to the user plane gateway. LI is therefore possible to perform. The flow passes an interface S5 between the PGW node 140 and a SGW node 150, and through an interface S1-U between the SGW node 150 and a RAN/eNB 160 comprising one or more radio base stations, e.g. eNB. The radio base station forwards the content flow via the air interface LTE-Uu to the designated UE 170.

In the other direction, flow of packets comprising content generated by the UE passes the same interfaces, nodes and gateways. When passing the IAP entity, LI is performed.

The main problem is to support LI functionality in the case of sending tokens through a core network to a RAN or to an UE. The content used by a UE does not pass a site comprising an IAP, when, or if, tokens are used. Any LI is therefore not possible.

SUMMARY

The problem to be solved by the current invention is to enable minimizing use of bandwidth and also Lawful Intercept to be performed even in these cases in a more efficient way on total network capacity level.

This object is achieved by a method and embodiments thereof. The provided method comprises steps of generating in a first node a token for an original content, OC, sending from said first node the OC and the corresponding token over a synchronization plane to one or more nodes or User Equipments, UEs, comprising restore functionality, and storing the token and the OC by means of the restore functionality. The method further comprises the sending from said first node the token over a user plane to one or more nodes comprising restore functionality or to the UE having generated a request for a corresponding OC, and receiving the token in the UE having generated the request or in a node of the communication network, the node or the UE comprising restore functionality and restoring the OC by means of the token.

Different embodiments of said method are disclosed in the description and independent claims.

This object is achieved according to another aspect by a system supporting said method and embodiments thereof. The provided system comprises a first node adapted to generate a token for an original content, OC, and to send from said first node the OC and the corresponding token over a synchronization plane to one or more nodes or User Equipments, UEs, comprising restore functionality, which is adapted to store the token and the OC. Said first node is further adapted to send the token over an user plane to one or more nodes comprising restore functionality or to the UE having generated a request for a corresponding OC, a node comprising restore functionality or a UE comprising restore functionality adapted to receive the token and to restore the OC by means of the token.

Different embodiments of said system are disclosed in the description and independent claims.

Further, a Lawful Intercept, LI, system is provided. Said system is adapted to receive from a first node in a telecommunications network an original content, OC, and a corresponding token, said means for receiving is further adapted for receiving from a second node in the telecommunications network the token corresponding to the OC and to recall the OC by means of a restore functionality and the received token.

Different embodiments of said LI system are disclosed in the description and independent claims.

Further, a method in a node of a telecommunications network is provided. The method comprises the steps of generating a token for an original content, OC, sending the OC and the corresponding token over a synchronization plane to one or more nodes or User Equipments, UEs, comprising restore functionality, and sending the token over a user plane to one or more nodes comprising restore functionality or to the UE having generated a request for a corresponding OC.

Different embodiments of said method are disclosed in the description and independent claims.

A node and different embodiments for supporting the method in a node in a telecommunication network is also provided. The node is adapted to generate a token for an original content, OC, to send the OC and the corresponding token over a synchronization plane to one or more nodes or User Equipments, UEs, comprising restore functionality, and to send the token over a user plane to one or more nodes comprising restore functionality or to the UE having generated a request for a corresponding OC.

Different embodiments of said node are disclosed in the description and independent claims.

Further, a computer program and a computer program product are provided. The computer program comprises computer program code which, when run in a processor of a node, causes the node to perform the method steps of generating a token for an original content, OC, sending the OC and the corresponding token over a synchronization plane to one or more nodes or User Equipments, UEs, comprising restore functionality, and sending the token over a user plane to one or more nodes comprising restore functionality or to the UE having generated a request for a corresponding OC.

The computer program product comprises a computer program and a computer readable means on which the computer program is stored.

The herein disclosed technology and solutions provide a more efficient bandwidth optimization solution compared to existing solutions. The bandwidth optimization is also extended to cover the PGW and SGW nodes and their functions. In addition, the bandwidth optimization can also be widened all the way between the main content server and the UE. In these cases the bandwidth optimization is also achieved both in the eNodeB and in the air interface, e.g. in the LTE Uu-interface.

BRIEF DESCRIPTION OF THE DRAWINGS

The foregoing, and other, objects, features and advantages of the present technology will be more readily understood upon reading the following detailed description in conjunction with the drawings in which.

DETAILED DESCRIPTION

In the following description, for purposes of explanation and not limitation, specific details are set forth, such as particular circuits, circuit components, techniques, etc. in order to provide a thorough understanding of the present technology. However, it will be apparent to one skilled in the art that the present technology may be practiced in other embodiments that depart from these specific details. In other instances, detailed descriptions of well-known methods, devices, and circuits are omitted so as not to obscure the description of the present technology with unnecessary detail.

The invention to be described is related to bandwidth optimization and Lawful Intercept solutions in mobile networks. The main gain with these solutions is to achieve transport network savings between the tokenization function and the restore function. In addition, these solutions also provide gain in the capacity of the network nodes that the token passes as much less information is transported also through these nodes. One special challenge with these bandwidth optimization solutions is to also enable Lawful/Legal intercept, LI.

Legal or Lawful interception (LI) is about obtaining communications network data pursuant to lawful authority for the purpose of analysis or evidence. Such data generally consists of signalling or network management information or, in fewer instances, the content of the communications.

Figure 1:
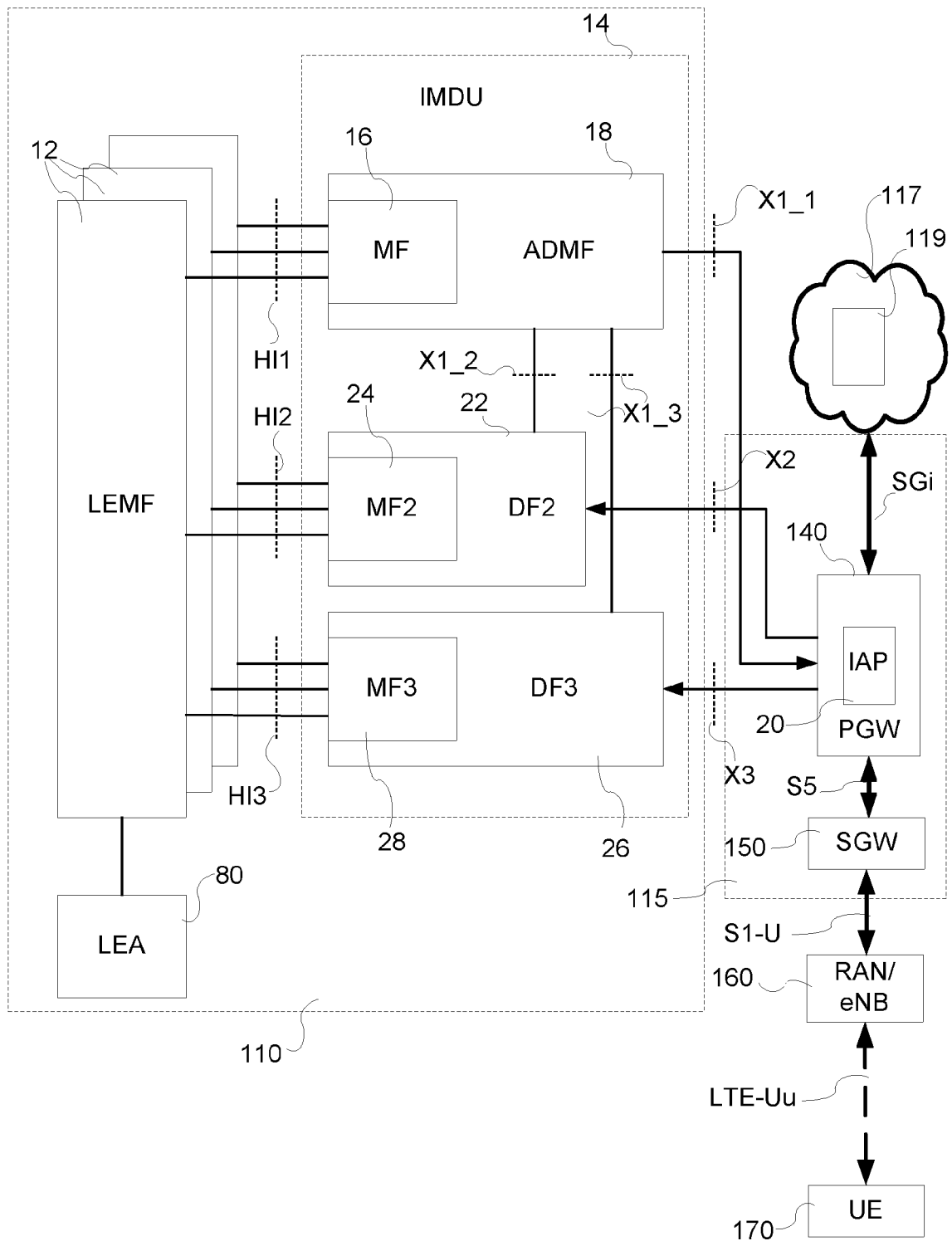
FIG. 1 is a block diagram of an exemplary Lawful Interception system and telecommunications network according to prior art.

One major point shown in FIG. 1 is that CN, backhaul, transport network nodes don't normally contain any LI functionality. FIG. 1 shows the 3GPP standardized interfaces for LI for the packet domain user plane gateway (PGW in this case).

The existing bandwidth optimization solution for the case of EPC and LTE is as following. The principle is that the main content server sends the original content through the PGW and SGW nodes (functions). Therefore the normal LI functionality in the PGW (and in the SGW in roaming scenarios) can be performed. Original Content is considered as one or more items of a set of original content contents, which may be stored, e.g. in an internet site by a service provider or telecommunications operator, etc. and which may be requested and received by wireless User Equipments, e.g. cellular telephones, mobile stations, laptops, smartphones, etc. For enabling the bandwidth optimization, a bandwidth optimization arrangement comprising a tokenization functionality entity and a restore functionality entity has been proposed in the network between the SGW and the UE.

The bandwidth optimization may be implemented by having the tokenization function in an interface close to the RAN. The original content is replaced by a token that is forwarded in the GTP-U tunnel for this UE and EPS bearer towards the eNodeB where the UE is currently located at. The restore function in the RAN interface close to the eNodeB performs then the reverse operation i.e. replaces the token with the original content before transmission via the eNodeB to the UE. The tokenization and the restore functions are synchronized to enable the use of the token instead of the original content, and enable the restore function to restore the original content based on the token.

The existing bandwidth optimization solution only offers reduced bandwidth limitation in different ways. One such area is that the known solution doesn't provide any bandwidth optimization or limitation in the PGW and SGW nodes, or functions, as the original content is transported via these nodes.

The bandwidth saving is achieved in the part of the transport network where the token is transported instead of the original content.

The following bandwidth optimization provides widened bandwidth limitation and control all the way between the main content server and the UE. In these cases the bandwidth optimization is also achieved both in the RAN (e.g. in the base station eNB) and in the air interface (e.g. the LTE Uu-interface).

The current invention provides an efficient way to support bandwidth optimization in mobile networks.

Two different principles on how LI can be supported in this case are disclosed in the following description:

1. In the first principle, the LI system also includes a restore functionality that is synchronized with the tokenization function.

2. In the second principle, a restore functionality is not included in the LI system.

Figure 9:
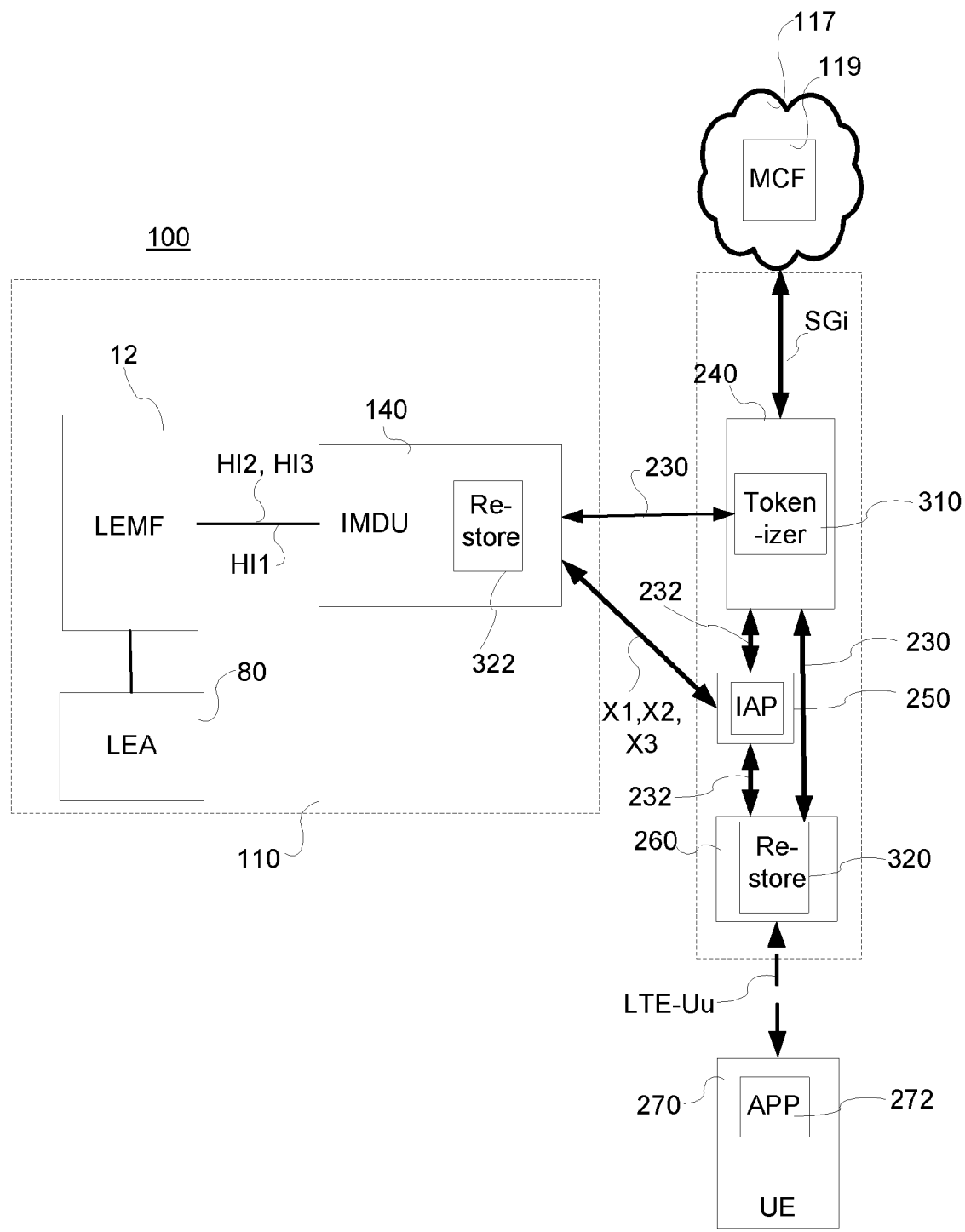
FIG. 9 is a block diagram of one exemplary LI system and telecommunications network.
Figure 10:
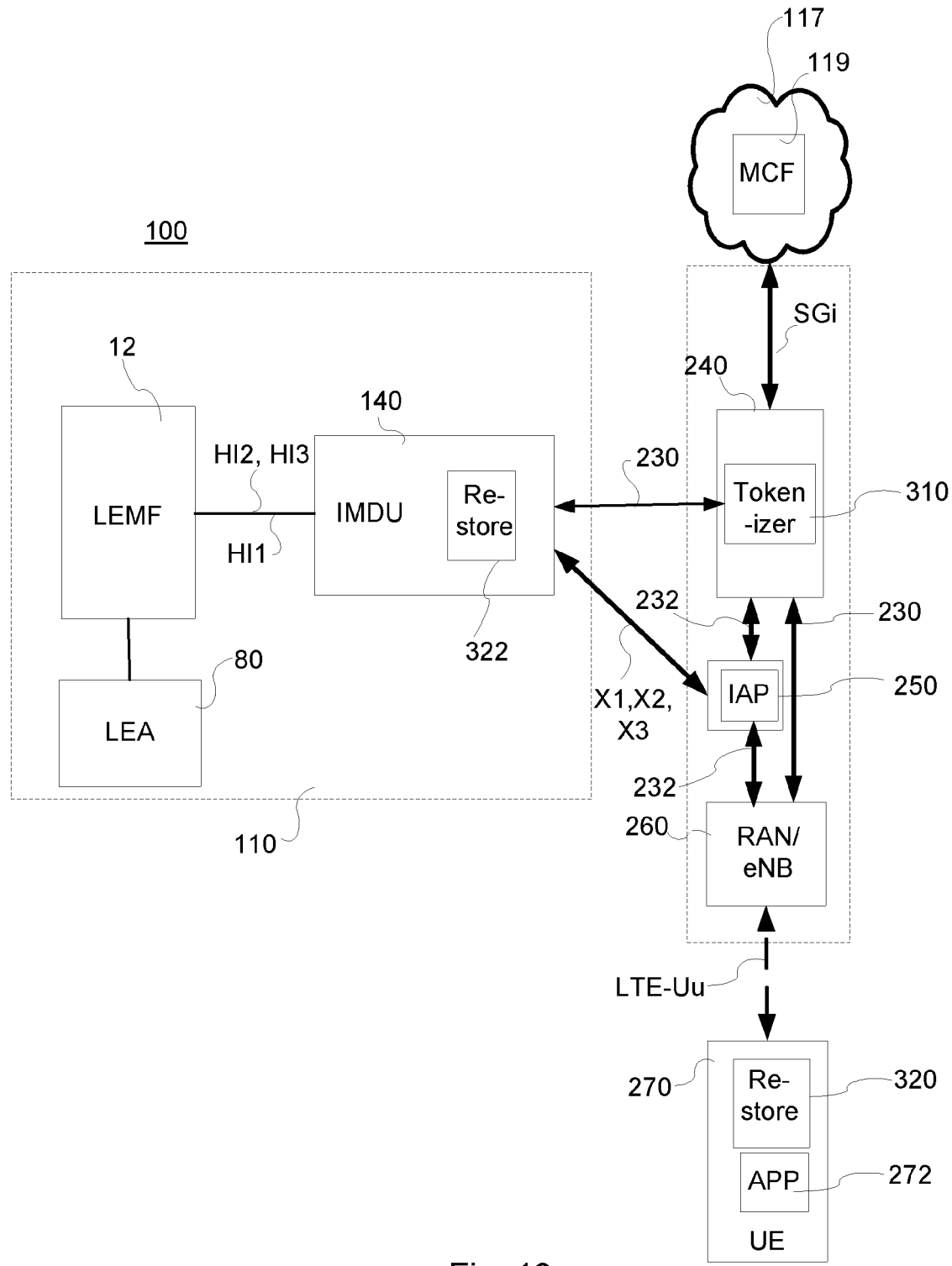
FIG. 10 is a block diagram of further one exemplary LI system and telecommunications network.
Figure 11:
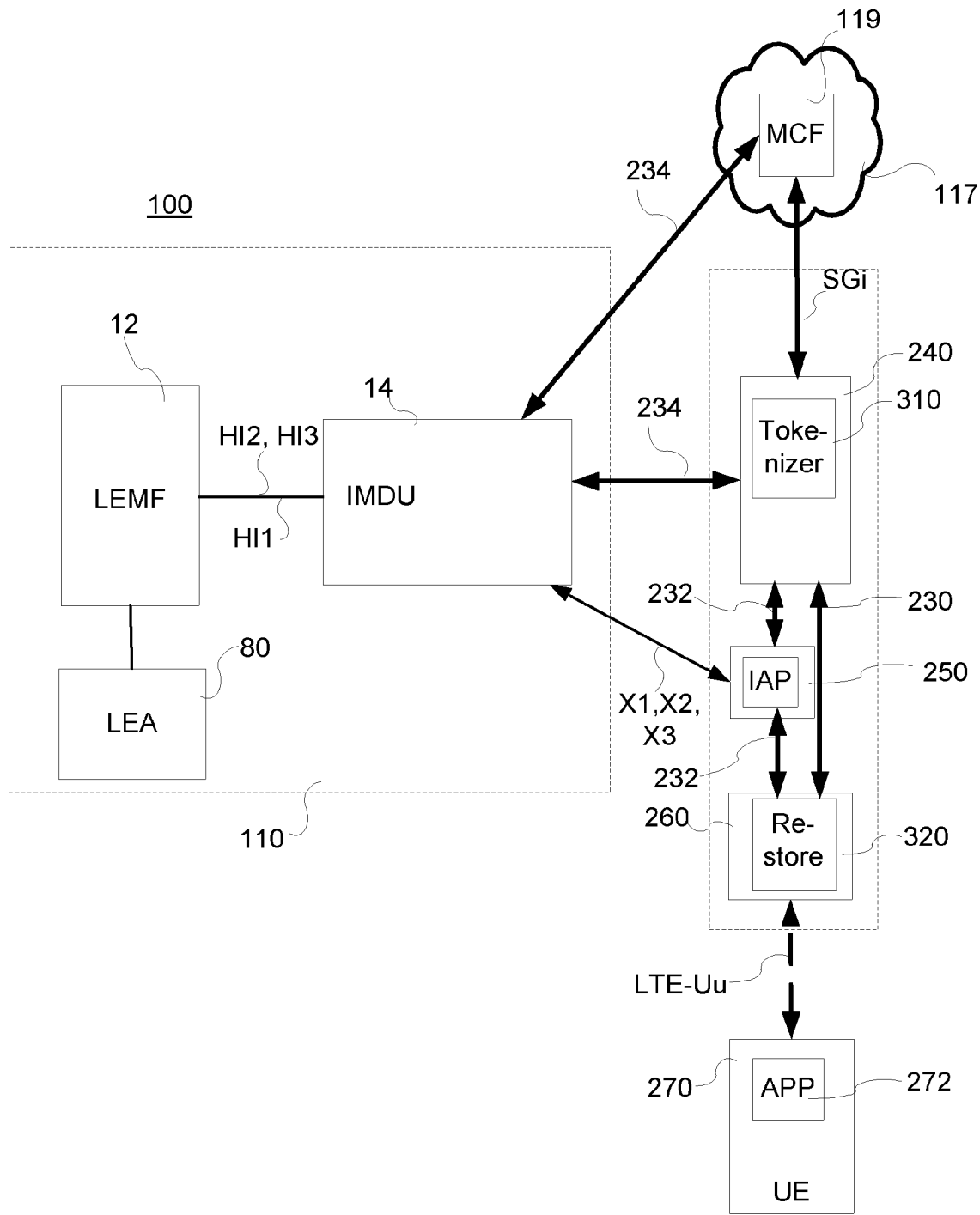
FIG. 11 is a block diagram of yet another exemplary LI system and telecommunications network.

Different examples of communication networks supporting the bandwidth optimization and LI system solutions are provided in FIGS. 9, 10 and 11. The exemplified communications network comprises a first node and a second node, which nodes are distributed in a core network and a RAN. Said RAN enables wireless communication with user equipments. Further, a bandwidth optimization arrangement comprising a tokenization functionality entity and a restore functionality entity is provided. The first node comprises tokenization functionality entity. The first node may either comprise a main content functionality or be able to connect to a node comprising said main content functionality via a suitable interface. The main content functionality may be a main content server and service associated with a service provider. The second node is a lawful Intercept Access Point, IAP, comprising means for enabling LI functionality with a LI system. Such a means may be an Intercept Control Element, ICE. Further, the restore functionality of the bandwidth optimization arrangement may be provided in a third node of the RAN or in the UE.

Basic for the present bandwidth optimization is that the tokenizer functionality and the restore functionalities are synchronized via a specific process, herein denoted as a token-content-synch process.

The token-content-synch process comprises a step of generating a token corresponding to an original content. Thus, one object of the process is to generate one or more unique tokens for each unique original content. The token may also be generated only to a subset of the original content. When a token has been generated, the token functionality sends the original content and its corresponding token to different restore functionalities for storing the original content in an associated storage together with token as an identifier. The tokens and original contents are in some embodiments sent via separate transmission links for the token-content-synch process. These links are shortly called "synchronization plane" and even the normal case is separate transmission links then these links can be arranged to use also any communication possibilities between the tokenizer and the restore functionalities. One additional embodiment would be to have the "synchronization plane" transmitted using either user plane bearers or control plane in the mobile networks. By sending tokens and original contents in the synchronization plane via separate transmission links instead of in the user plane, data packet traffic is reduced and thereby used bandwidth in the user plane could also be reduced even more. The synchronizing process enables the restore functionality to build the original content when the corresponding token is received. The size of a token may be less than a few Kbytes or even couple of tens or hundreds of bytes, while the size of the original content may be several Mbytes. The bandwidth reduction is therefore enormous if a token is sent in the user plane instead of the whole original content.

Figure 2:
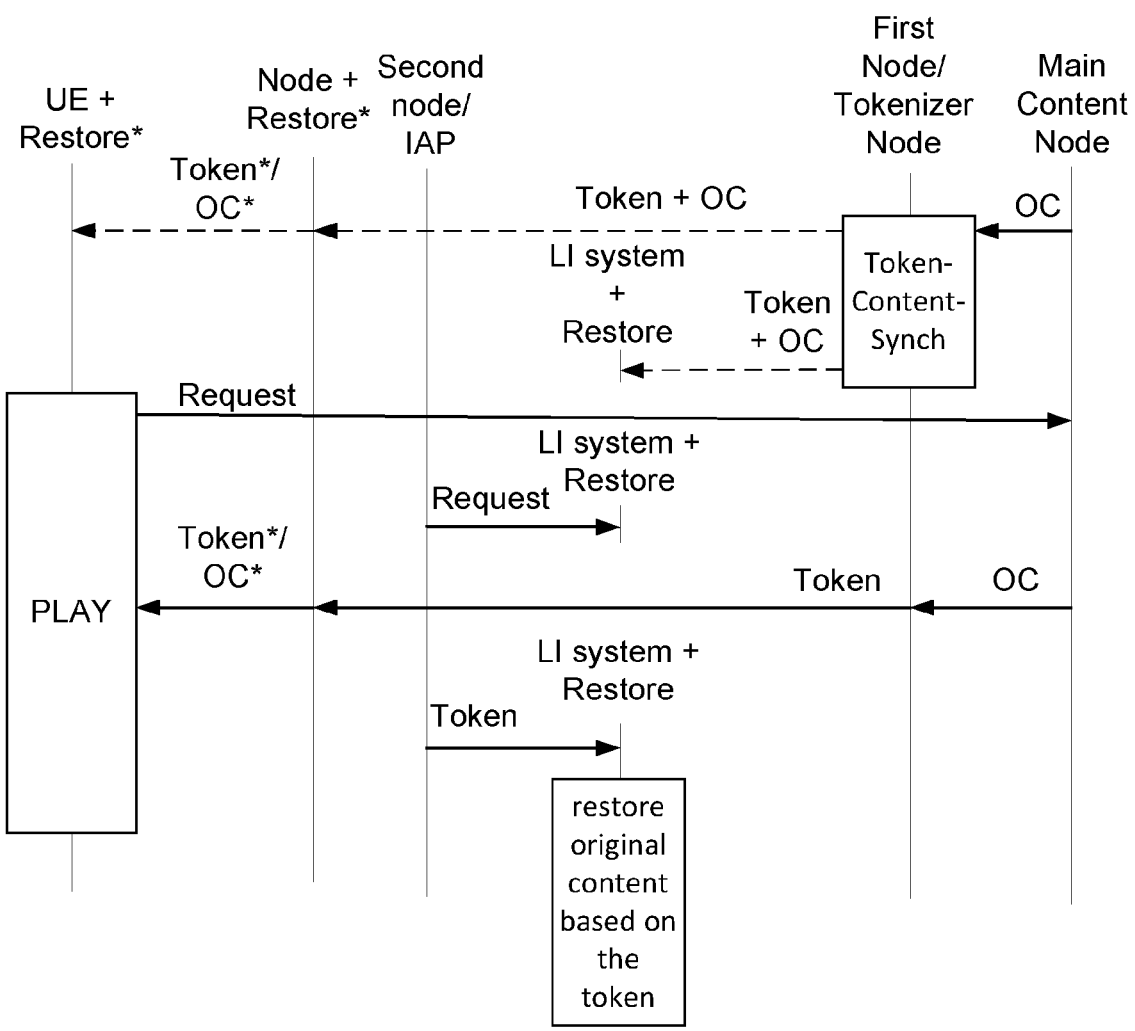
FIG. 2 is a signalling scheme illustrating an example of the signalling according to a first embodiment of the bandwidth optimization method and arrangement.

FIG. 2 is a signalling scheme illustrating examples of the signalling according to a first embodiment of the bandwidth optimization method and arrangement. In this first embodiment, the LI system is provided with restore functionality. The different examples of the first embodiment, restore functionality may also be provided in either a node in the CN or in the RAN, e.g. RNC, eNB, eNodeB, base station (BS), etc., or in the UE. Said node having restore functionality in the CN or RAN is herein denoted third node. In FIG. 2, the different examples, or rather options, of the first embodiment, wherein restore functionality may either be situated in the third node, or in the UE, are illustrated by indicating "Restore" as "Restore". The "*" indicates that OC is sent if restore functionality is situated in the third node, but if restore functionality is situated in the UE, the UE receives a token instead.

The restore functionality of the LI system may preferably be situated in the IMDU block. Further, there is no IAP/ICE in the first node comprising the tokenizer functionality or in the main content storing node, i.e. the main content node.

When the token-content-synch process is performed by the tokenizer functionality in the first node, a token and the corresponding OC is sent via the synchronization plane to each downstream node or UE comprising restore functionality. Thus, an OC and its corresponding token are even addressed and sent to a LI system as said LI system comprises restore functionality. The tokenizer functionality may be provided with storage means, e.g. lists, tables, etc. for storing addresses to downstream nodes comprising restore functionality.

The token and the corresponding OC are stored in a memory storage associated with a node or UE, and LI system. The communications system is now prepared for using the token for the corresponding OC in the communications network, which token will reduce the amount of used bandwidth compared to if the whole OC had been sent in the user plane.

Thus, when a request message is sent from a UE to a main content node, said request message comprises a request for an OC. The request message may be generated by means, e.g. a software application app (APP), in the UE and the generation is initiated by the user, e.g. when starting an app needing said OC. As indicated in the example of the figure, the app may provide video play functionality, PLAY, to the UE.

When the request message passes the second node, which is an IAP that comprises an ICE, a copy of the request is sent to the IMDU.

The main content node sends an OC to the first node, in which the tokenizer functionality identifies the OC and its corresponding token. The first node then forwards the token instead of the OC for reducing the used bandwidth.

When the token passes the second node, which is an IAP and which comprises the ICE, the token is forwarded to the IMDU (see FIG. 1). The IMDU comprises restore functionality and by means of the token information, said restore functionality is able to restore the OC or retrieve the OC from a memory storage where said OC is stored.

The token is received by the restore functionality entity in either the third node or in the UE. By means of the token information, said restore functionality is able to restore the OC or retrieve the OC from the memory storage where said OC is earlier stored.

The LI system is now be able to and configured to deliver all information to the LEA.

Figure 3:
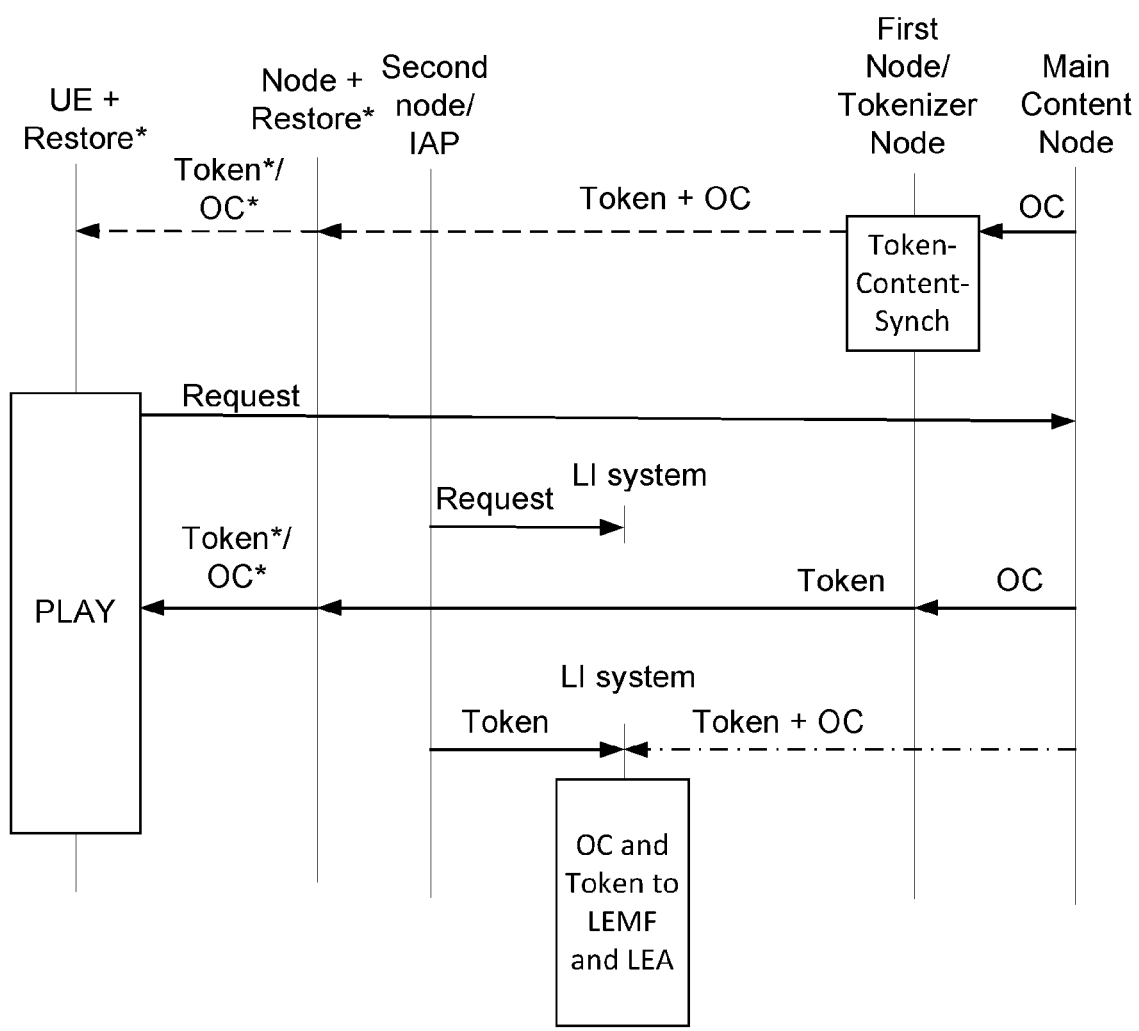
FIG. 3 is a signalling scheme illustrating an example of the signalling according to a second embodiment of the bandwidth optimization method and arrangement.

FIG. 3 is a signalling scheme illustrating examples of the signalling according to a second embodiment of the bandwidth optimization method and arrangement.

In this second embodiment, the LI system is not provided with restore functionality. Further, the first node comprising the tokenizer functionality and/or in the main content storing node, i.e. main content node, has a connection to the LI system. Thus, either one of the nodes or both said nodes are connected to or connectable to the IMDU of the LI system, e.g. via an IAP/ICE, or that either of one of the nodes or both said nodes contain the IAP/ICE functionality. In FIG. 3, the different examples, or rather options, of the second embodiment, wherein restore functionality may either be situated in the third node, or in the UE, or in both the third node and the UE is illustrated by indicating "Restore" as "Restore". The "*" indicates that OC is sent if restore functionality is situated in the third node, but if restore functionality is situated in the UE, the UE receives a token instead.

When the token-content-synch process is performed by the tokenizer functionality in the first node, a token and the corresponding OC is sent via the synchronization plane to each downstream node or UE comprising restore functionality. Thus, an OC and its corresponding token are not addressed and sent to a LI system as said LI system does not comprise a restore functionality. The tokenizer functionality may be provided with storage means, e.g. lists, tables, etc. for storing addresses to downstream nodes comprising restore functionality.

The token and the corresponding OC are stored in a memory storage associated with a node or UE when received. The communications system is now prepared for using the token for the corresponding OC in the communications network, which token will reduce the amount of used bandwidth compared to if the whole OC had been sent in the user plane.

Thus, when a request message is sent from a UE to a main content node, said request message comprises a request for an OC. The request message may be generated by means, e.g. a software application app (APP), in the UE and the generation is initiated by the user, e.g. when starting an app needing said OC. As indicated in the example of the figure, the app may provide video play functionality, PLAY, to the UE.

When the request message passes the second node, which is an IAP and that comprises the ICE, a copy of the request is sent to the IMDU.

The main content node sends an OC to the first node, which tokenizer functionality identifies the OC and its corresponding token. The first node then forwards the token instead of the OC for reducing the used bandwidth. As described above, one of the first node and main content node or both of said nodes are connected to or connectable to the IMDU of the LI system, e.g. via an IAP/ICE, or that either of one of the nodes or both said nodes contain the IAP/ICE functionality. The connection between the LI system and the first node and/or main content node results in that OC is transmitted from the main content node can also be sent to the LI system. A token may also be sent to the LI system to enable the LI system to identify tokens received from the second node (described below). This identification may be beneficial as it would allow the LI system to remove the tokens received from the second node, i.e. not forward these to the rest of the LI logic. In addition, the token received from the second node may be used as a time indication when the information is sent to the UE, if there would be significant difference in duration when the OC is received from the first node or main content node and when the token is received from the second node.

When the token passes the second node, which is an IAP and which comprises the ICE, the token is forwarded to the IMDU. The IMDU do not comprise restore functionality in this embodiment and therefore the token is not useful regarding the restore functionality. It may however be beneficial that the IMDU is capable of detecting and removing tokens received from the second time so that these are not forwarded to the rest of the LI logic. In this embodiment the OC is received from the first node or main content node and if the token is also received from the first node or main content node then it may be used by the IMDU to identify tokens as they are received together. The token received from the second node may also be used as the time indication when the OC was delivered to the UE (as described above).

When the token is received by the third node or the UE, at least one of the entities comprises restore functionality. By means of the token information, said restore functionality is able to build the OC or retrieve the OC from a memory storage where said OC is stored.

The LI system will now be able to deliver all information to the LEA.

Figure 4:
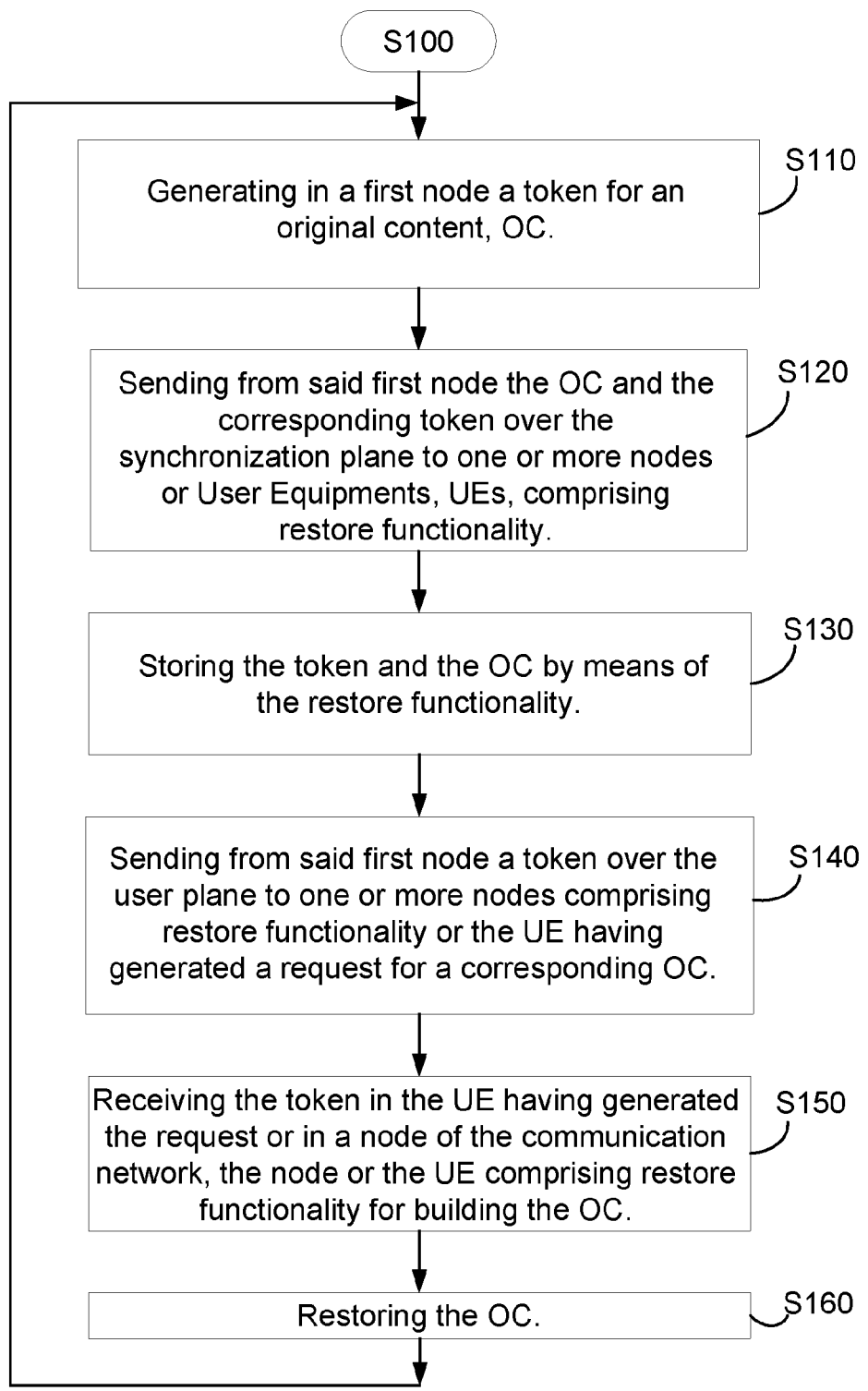
FIG. 4 is a flowchart illustrating an example of an embodiment of a method.

FIG. 4 is a flowchart illustrating an example of an embodiment of a method, S100, in a telecommunications network. The method comprises the steps of:
S110:—generating in a first node a token for an original content, OC;
S120:—sending from said first node the OC and the corresponding token over the synchronization plane to one or more nodes or User Equipments, UEs, comprising restore functionality;
S130:—storing the token and the OC by means of the restore functionality;
S140:—sending from said first node a token over the user plane to one or more nodes comprising restore functionality or the UE having generated a request for a corresponding OC;
S150:—receiving the token in the UE having generated the request or in a node of the communication network, the node or the UE comprising restore functionality for restoring the OC;
S160:—restoring the OC.

Figure 5A:
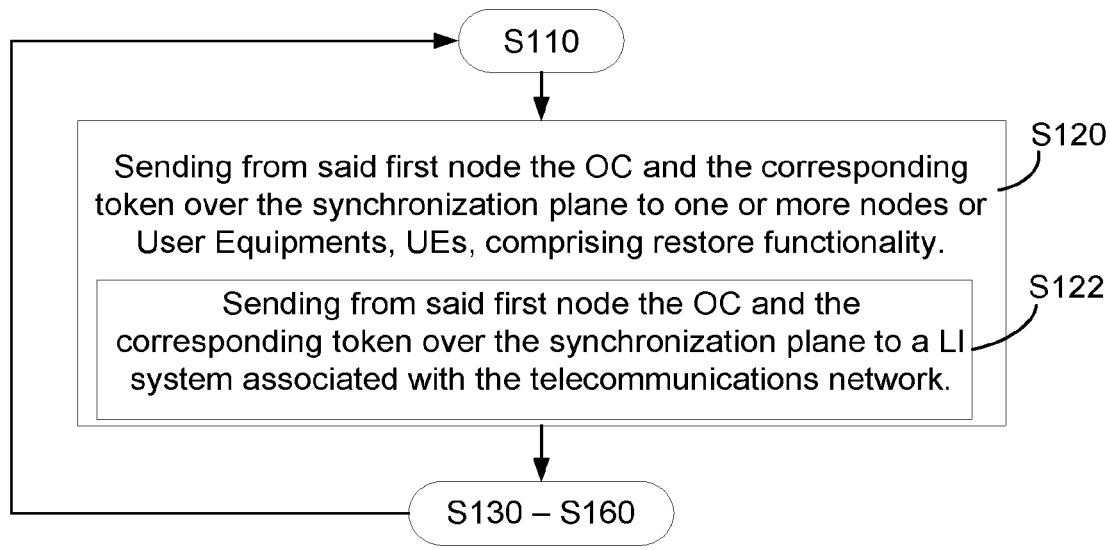
FIGS. 5A and 5B are flowcharts illustrating examples of further embodiments of the method.
Figure 5B:
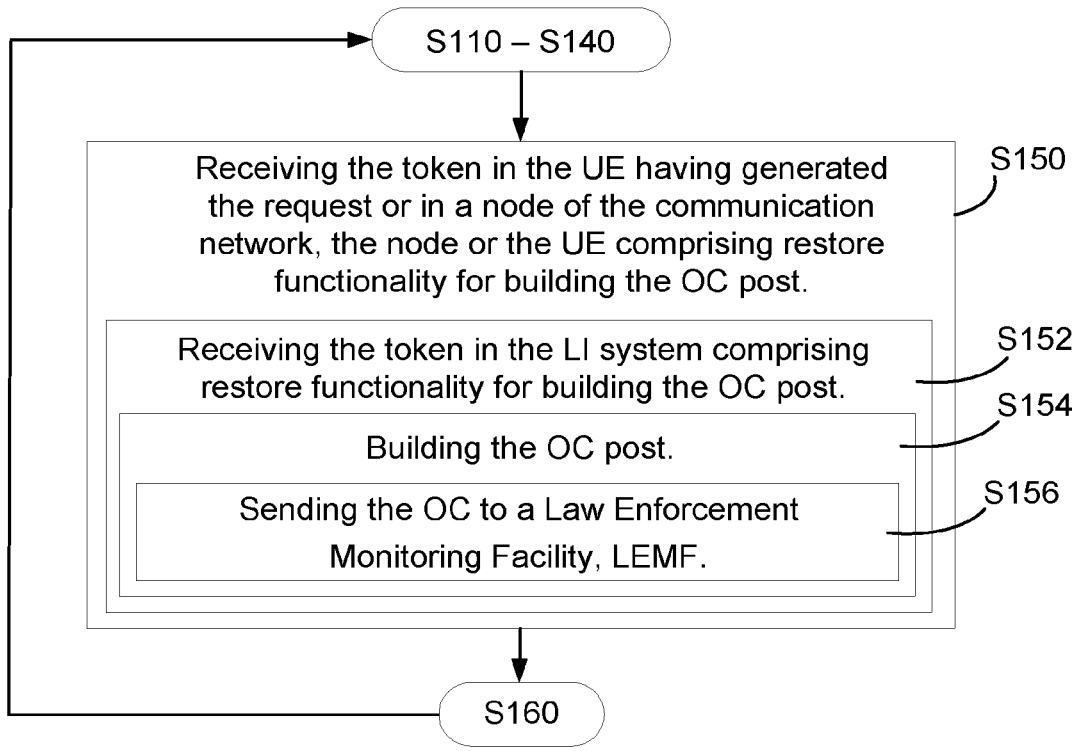

FIGS. 5A and 5B are flowcharts illustrating an example of further one embodiment of the method, S100, in a telecommunications network.

According to one case, the telecommunications network is associated with a Lawful Intercept, LI, system, which comprises restore functionality. The method is therefore adapted to serve the LI system. This object is achieved by modifying steps S120 and S150 of the method S100 in the FIG. 4.

FIG. 5A illustrates the modified step S120 in the method S100. The step of sending, S120, involves also:

S122:—sending from said first node the OC and the corresponding token over the synchronization plane to a LI system associated with the telecommunications network.

FIG. 5B illustrates the modified step S150 in the method S100. The step of receiving the token, S150, is further adjusted to involve:
S152:—receiving the token in the LI system comprising restore functionality for restoring the OC;
S154:—restoring the OC;
S156:—sending the OC to a Law Enforcement Monitoring Facility, LEMF.
The method may optionally comprise the step of:
S158:—sending the token to a Law Enforcement Monitoring Facility, LEMF.

Figure 6:
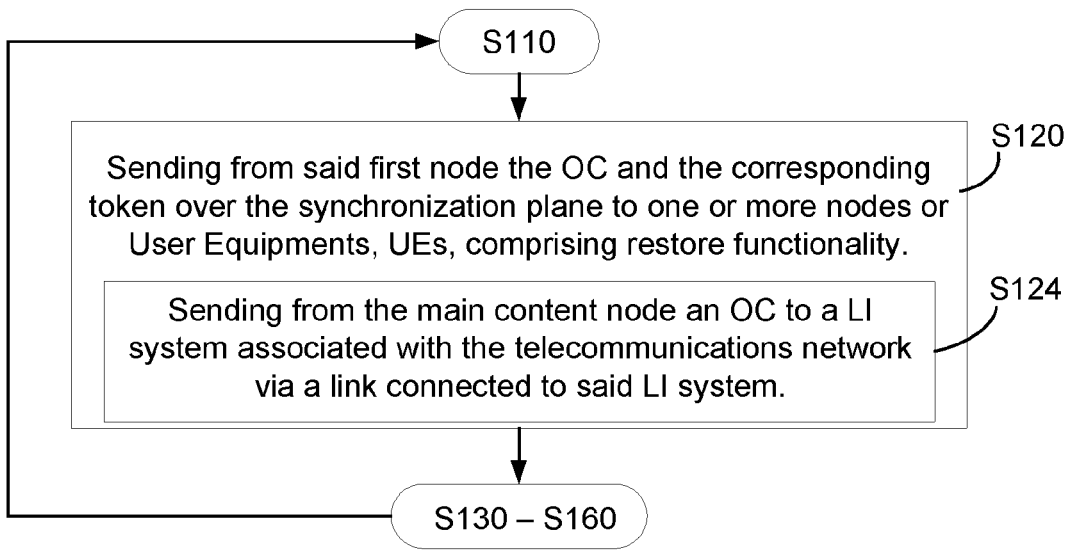
FIG. 6 is a flowchart illustrating an example of further one embodiment of the method.

FIG. 6 is a flowchart illustrating an example of further one embodiment of the method, S100, in a telecommunications network. The main content node of the telecommunications network is connected to or connectable to an associated LI system. An embodiment of the method S100 may therefore be adapted to comprise:
S124:—sending from the main content node an OC to a LI system associated with the telecommunications network via a link connected to said LI system.

Figure 7:
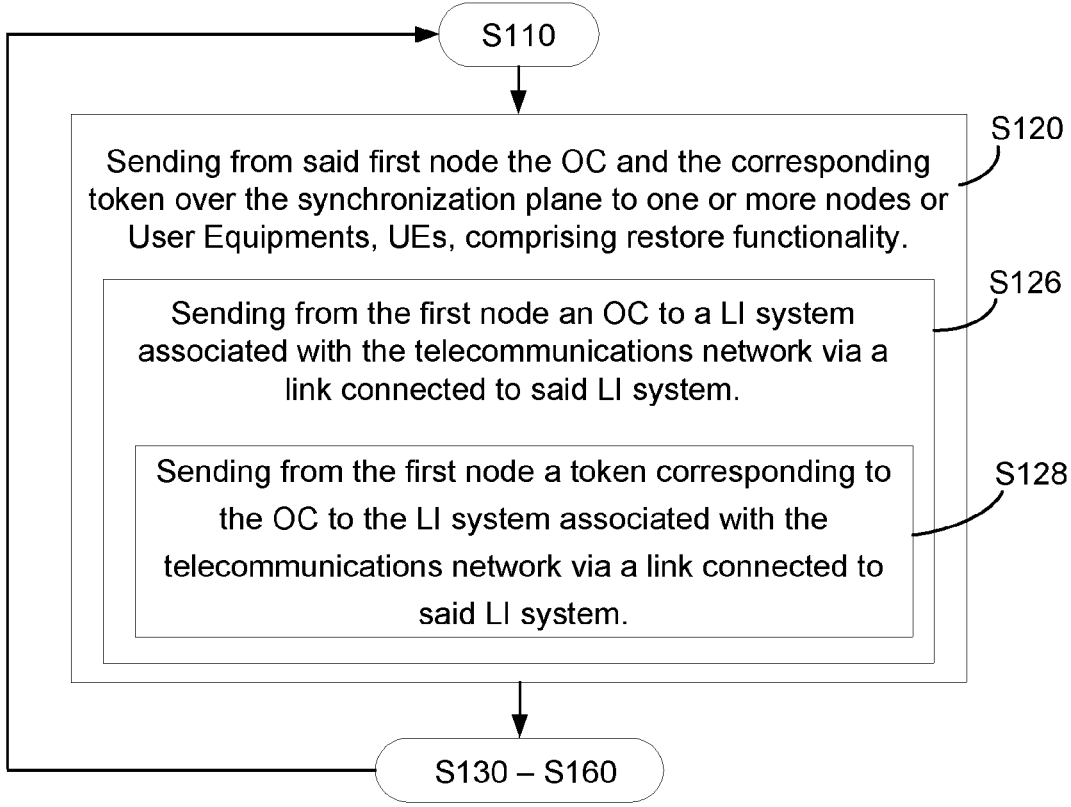
FIG. 7 is a flowchart illustrating an example of further one embodiment of the method.

FIG. 7 is a flowchart illustrating an example of further one embodiment of the method, S100, in a telecommunications network. According to further alternatives, the first node may comprise a main content storage, e.g. when the first node and the main content node are situated together. The first node therefore comprises at least one OC. The step of sending, S120, is therefore adapted to involve:
S126:—sending from the first node an OC to a LI system associated with the telecommunications network via a link connected to said LI system.

Said step S126 may further involve:
S128:—sending from the first node a token corresponding to the OC to the LI system associated with the telecommunications network via a link connected to said LI system.

Figure 8A:
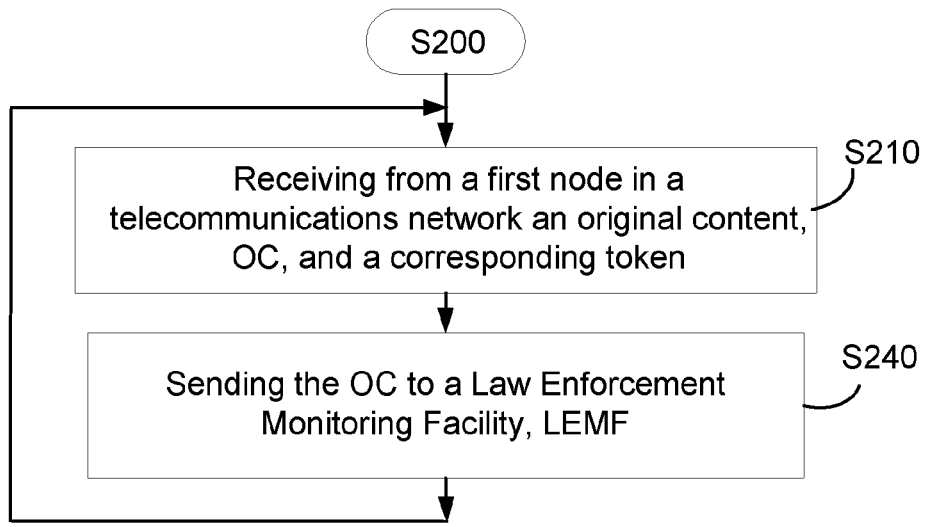
FIGS. 8A and 8B are flowcharts illustrating examples of an embodiment of the method.

FIG. 8A is a flowchart illustrating an example of the embodiment of the method, S200, in a LI system. The LI system is associated with, i.e. connected to, a telecommunications network. Thus, it is provided a method, S200, in a Lawful Intercept, LI, system, e.g. in the IMDU block. The embodiment comprises the steps of:
S210:—receiving from a first node in a telecommunications network an original content, OC, and a corresponding token;
The method may further comprise the step of:
S240:—sending the OC to a Law Enforcement Monitoring Facility, LEMF.
According to yet another embodiment of the method S200, the method
S200 may optionally comprise the step of:
S242:—sending the token to a Law Enforcement Monitoring Facility, LEMF.

Figure 8B:
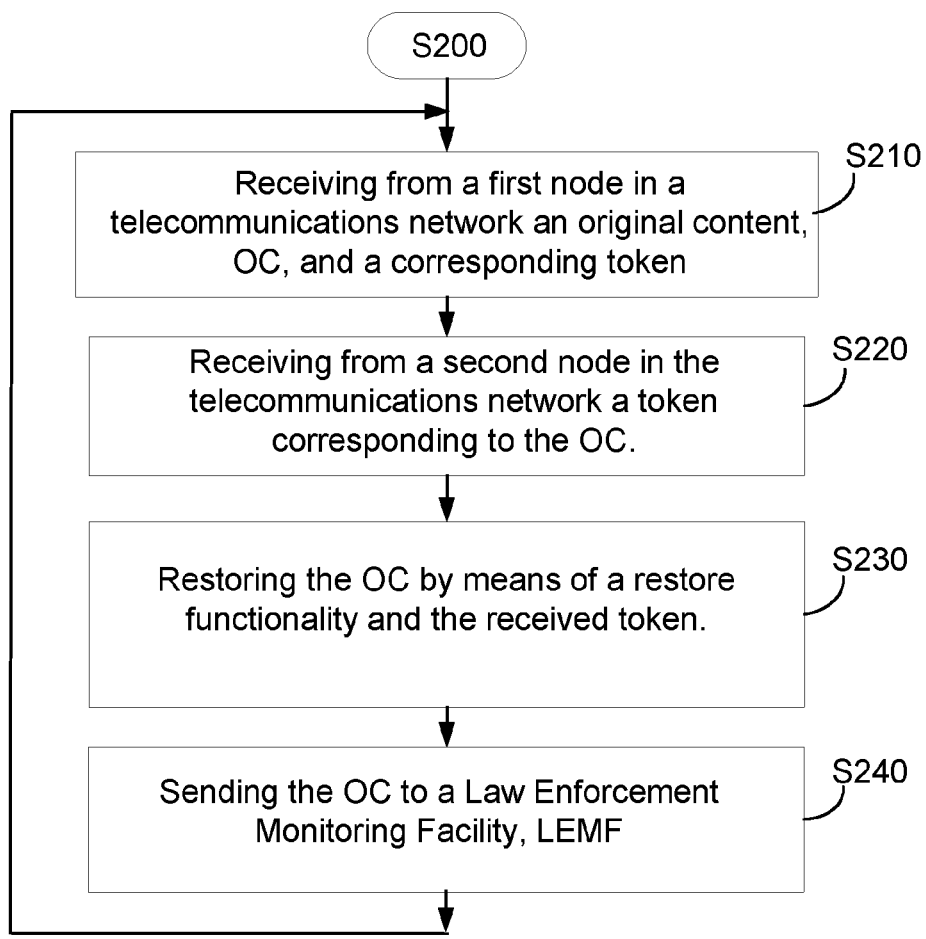

FIG. 8B is a flowchart illustrating another example of the embodiment of the method, S200, in a LI system. The LI system is associated with, i.e. connected to, a telecommunications network. Thus, it is provided a method, S200, in a Lawful Intercept, LI, system, e.g. in the IMDU block. The embodiment comprises the steps of:
S210:—receiving from a first node in a telecommunications network an original content, OC, and a corresponding token;
S220:—receiving from a second node in the telecommunications network the token corresponding to the OC;
S230:—restoring the OC by means of a restore functionality and the received token.

The method may further comprise the step of:

S240:—sending the OC to a Law Enforcement Monitoring Facility, LEMF. According to yet another embodiment of the method S200, the method S200 may optionally comprise the step of:

S242:—sending the token to a Law Enforcement Monitoring Facility, LEMF.

In the following a number of embodiments of a system for supporting the above described methods in a telecommunications network will be presented with reference to FIGS. 9, 10 and 11.

FIG. 9 is a block diagram illustrating one embodiment of the system wherein the above examples and embodiments of the described method are supported. The same blocks and units in FIGS. 9, 10 and 11 have the same reference number.

A system 100 in a telecommunications network is illustrated, which system supports the message and signalling flow according to one alternative described above in the signalling scheme of FIG. 2.

The telecommunication network is able to provide UEs with services from service providers. One such service may consist of user data packets sent as an Original Content, OC, to a UE 270 from a service provider's home site, here denoted as Main Content Node, 119, which comprises a main content functionality, MCF, 117. The OC is used by an APP 272, which is a software application, e.g. for playing OC if said OC is a video recording. User data packets are usually sent to a first node, e.g. a PGW, of the telecommunications network. The first node may then direct the user data via a user plane 232 to a second node 250 which comprises an IAP for a LI system. The second node 250 directs the user data to a third node 260, e.g. a base station, in a RAN. The third node 260 comprises radio access means (not shown) for transmitting and receiving radio traffic over an air interface, e.g. LTE-Uu, connecting one or more UEs 270.

The first node 240 is provided with a tokenizer entity 310 which is adapted to perform a token-content-synchronization process, wherein the tokenizer generates a token for an original content, OC, and sends from said first node 240 the OC and the corresponding token over a synchronization plane 230 to one or more nodes 260, or User Equipments, UEs, 270 comprising restore functionality 320. The restore functionality 320 is adapted to store the token and the OC. The first node 240 is further adapted to send the token over a user plane 232 to one or more nodes comprising restore functionality 320 or to the UE 270 having generated a request for a corresponding OC. The restore functionality 320 of a UE 270 or a node 260 is adapted to receive a token and to restore the OC by means of the token.

According to the embodiment in FIG. 9, the first node 240 is configured to send the OC and the corresponding token over a synchronization plane 230 to a Lawful Intercept system 110, which is associated with the telecommunications network to the LI system comprising a LI system restore functionality 322. Said restore functionality 322 may be provided in an IMDU 140 of the LI system.

As described above, when the request message passes the second node 250, which is an IAP that comprises an ICE, a copy of the request may sent to the IMDU 140 via the one or two of the interfaces X1, X2, X3. The synchronization plane 230 may use a separate link, as illustrated in FIG. 11, see link 234.

The main content node 119 sends an OC to the first node, in which the the tokenizer functionality identifies the OC and its corresponding token. The first node then forwards the token instead of the OC for reducing the used bandwidth.

When the request is received by the main content node it sends an OC to the first node, in which the tokenizer functionality identifies the OC and its corresponding token. The first node then forwards the token instead of the OC for reducing the used bandwidth.

When the token passes the second node 250 being an IAP, a copy of the token is forwarded to the IMDU 140. The IMDU comprises a restore functionality and by means of the token information, said restore functionality is able to restore the OC or retrieve the OC from a memory storage (not shown) where said OC is stored.

The LI system restore functionality 322 and the IMDU 140 is adapted to send the OC over any of the interfaces HI1, HI2, HI3 to a Law Enforcement Monitoring Facility, LEMF, 12. The LEMF forwards the OC to the LEA 80.

In the embodiment of the system and telecommunications network according to FIG. 9, a first alternative is illustrated. In this first alternative, the third node 260 comprises the restore functionality 320. When the token is received by the third node 260 the restore functionality uses the token information to restore the OC or retrieve the OC from a memory storage (not shown) where said OC is stored.

The restore functionality 320 and the third node is adapted to send the OC to the UE over the air interface.

FIG. 10 is a block diagram illustrating another embodiment of the system wherein the above examples and embodiments of the described method are supported.

A system 100 in a telecommunications network is illustrated, which system supports the message and signalling flow according another alternative described above in the flowchart of FIG. 2.

In the first embodiment of the system and telecommunications network according to FIG. 9, a first alternative is illustrated.

In the second embodiment of the system and telecommunications network according to FIG. 10, a second alternative is illustrated. The only difference between the first and second embodiments is that in the first embodiment, the third node 260 comprises the restore functionality 320, while in the second embodiment the restore functionality 320 is provided in the UE 270. When the token is received by the third node 260, the third node forwards the token to the UE and the restore functionality, which uses the token information to restore the OC or retrieve the OC from a memory storage (not showed) where said OC is stored. The App 270 is then able to use the OC, e.g. for playing the video content in the OC.

FIG. 11 is a block diagram illustrating further one embodiment of the system wherein the above examples and embodiments of the described method are supported.

A system 100 in a telecommunications network is illustrated, which system supports the message and signalling flow according another alternative described above in the flowchart of FIG. 3.

The main content functionality, MCF, is situated in the main content node 119. The first node 240 comprises the tokenizer functionality entity 310. The second node 250 of the telecommunications network is an IAP. The main content functionality comprises at least one OC. Said first node is adapted to receive the OC from the main content node 119 and to send the OC and the corresponding token over the synchronization plane to one or more nodes or User Equipments, UEs, comprising restore functionality. The LI system is not provided with a restore functionality, thus the IMDU of the LI system will not receive a token and its corresponding OC during the token-content synch process. Instead, the main content node 119, comprising at least one OC, is adapted to send from the main content node 119 an OC to the LI system associated with the telecommunications network via a link 234 connected to said LI system. The link 234 may be realized using any of the X1, X2 and X3 interfaces. As described in the signalling scheme in FIG. 3 above, the LI system according to this embodiment is not provided with restore functionality. Further, the first node comprises the tokenizer functionality and/or in the main content storing node, i.e. main content node, has a connection 234 to the LI system. Thus, either one of the nodes or both said nodes are connected to or connectable to the IMDU of the LI system via links 234, 236, or that either of one of the nodes or both said nodes contain the IAP/ICE functionality.

In FIG. 3, the different examples, or rather options, of the embodiment, the restore functionality may either be situated in the third node, or in the UE, or in both the third node and the UE is illustrated by indicating "Restore" as "Restore". The "*" indicates that OC is sent if restore functionality is situated in the third node, but if restore functionality is situated in the UE, the UE receives a token instead. In FIG. 11, the embodiment where the restore functionality is situated in the third node 260.

When the token-content-synch process is performed by the tokenizer functionality in the first node, a token and the corresponding OC is sent via the synchronization plane to each downstream node or UE comprising restore functionality. Thus, an OC and its corresponding token are not addressed and sent to a LI system as said LI system does not comprise a restore functionality. The tokenizer functionality may be provided with storage means, e.g. lists, tables, etc. for storing addresses to downstream nodes comprising restore functionality.

The token and the corresponding OC are stored in a memory storage associated with the third node 260 when received. The communications system is now prepared for using the token for the corresponding OC in the communications network, which token will reduce the amount of used bandwidth compared to if the whole OC had been sent in the user plane.

Thus, when a request message is sent from a UE 270 to a main content node 119, said request message comprises a request for an OC. The request message may be generated by means, e.g. a software application APP, 272 in the UE and the generation is initiated by the user, e.g. when starting an app needing said OC. As indicated in the example of the figure, the app may provide video play functionality, PLAY, to the UE.

When the request message passes the second node 250, which is an IAP and that comprises the ICE, a copy of the request is sent to the IMDU.

The main content node sends an OC to the first node, in which the tokenizer functionality identifies the OC and its corresponding token. The first node then forwards the token instead of the OC for reducing the used bandwidth. As described above, one of the first node 240 or main content node 119 or both of said nodes are connected to or connectable to the IMDU of the LI system, via separate links 234, 236, or that either of one of the nodes or both said nodes contain the IAP/ICE functionality. The connection between the LI system and the first node and/or main content node results in that OCs transmitted from the main content node can also be sent to the LI system. A token may also be sent to the LI system to enable the LI system to identify tokens received from the second node. This identification may be beneficial as it would allow the LI system to remove the tokens received from the second node, i.e. not forward these to the rest of the LI logic. In addition, the token received from the second node may be used as the time when the information is sent to the UE, if there would be significant difference in duration when the OC is received from the first node or main content node and when the token is received from the second node.

Figure 12:
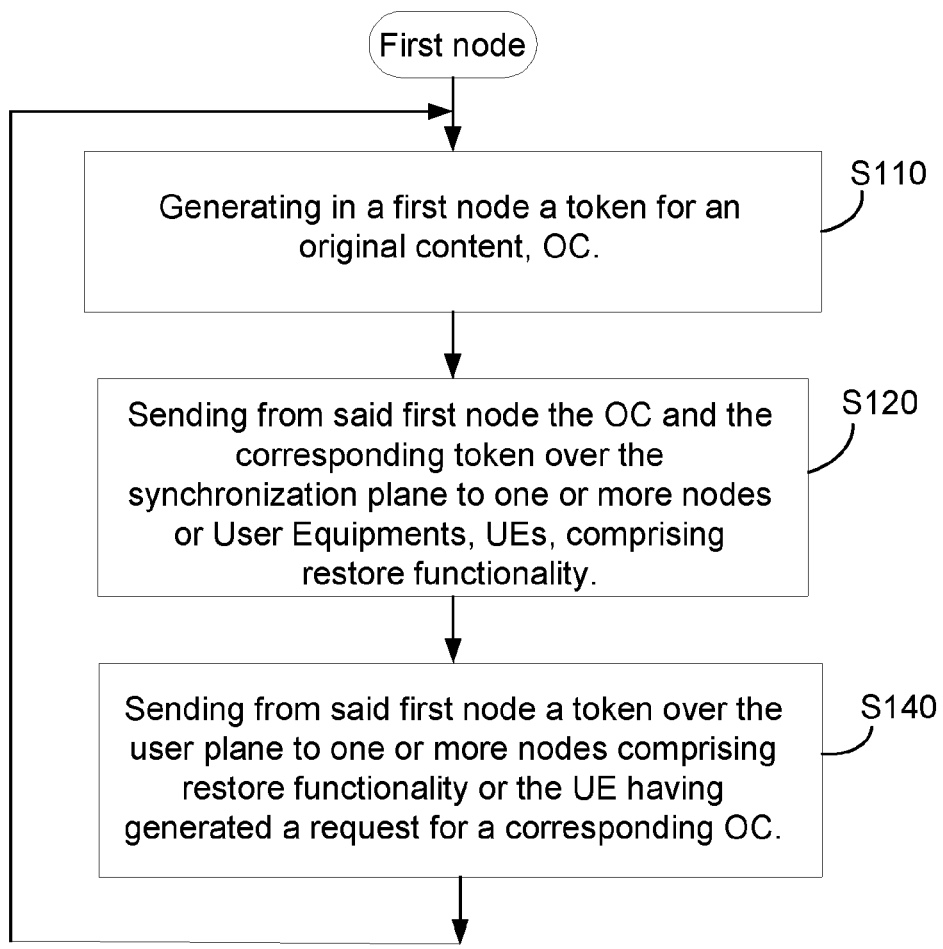
FIG. 12 is a flowchart illustrating one example of an embodiment of a method performed in a node.

FIG. 12 is a flowchart illustrating an embodiment of a method in a node of a telecommunications network, e.g. the first node. Said method supports the provided method S100 and its embodiments. The method comprises the steps of:

S110:—generating a token for an original content, OC;

S120:—sending the OC and the corresponding token over a synchronization plane to one or more nodes or User Equipments, UEs, comprising restore functionality;

S140:—sending the token over a user plane to one or more nodes comprising restore functionality or to the UE having generated a request for a corresponding OC.

Figure 13:
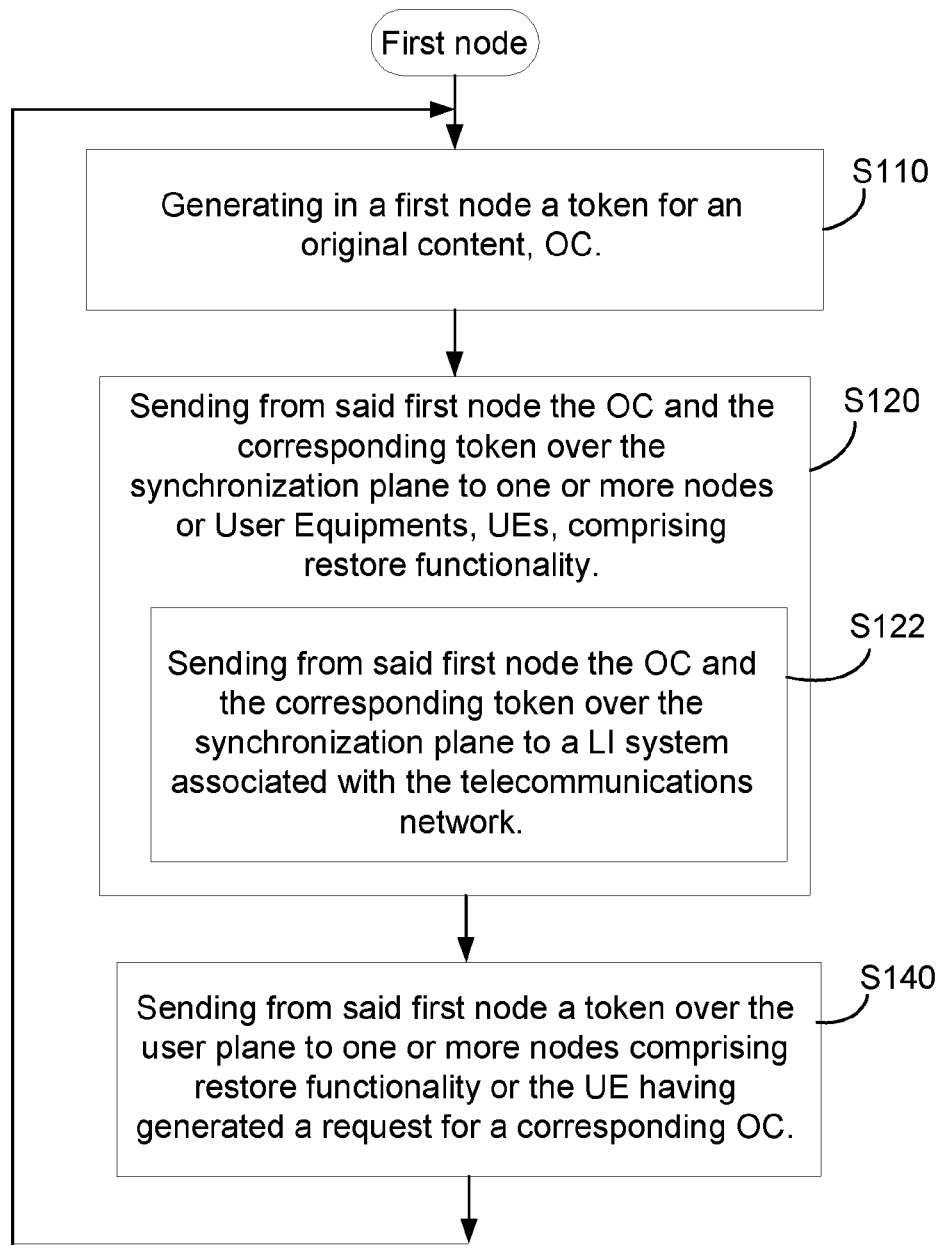
FIG. 13 is a flowchart illustrating further one example of further one embodiment of the method performed in a node.

FIG. 13 is a flowchart illustrating another embodiment of a method in a node of a telecommunications network, e.g. a first node. Said method supports the provided method S100 and its embodiments. The telecommunications network is associated with a Lawful Intercept, LI, system, which comprises restore functionality. The step of sending from said first node the OC and the corresponding token over the synchronization plane involves:

S122:—sending the OC and the corresponding token over the synchronization plane to a LI system associated with the telecommunications network.

Figure 14:
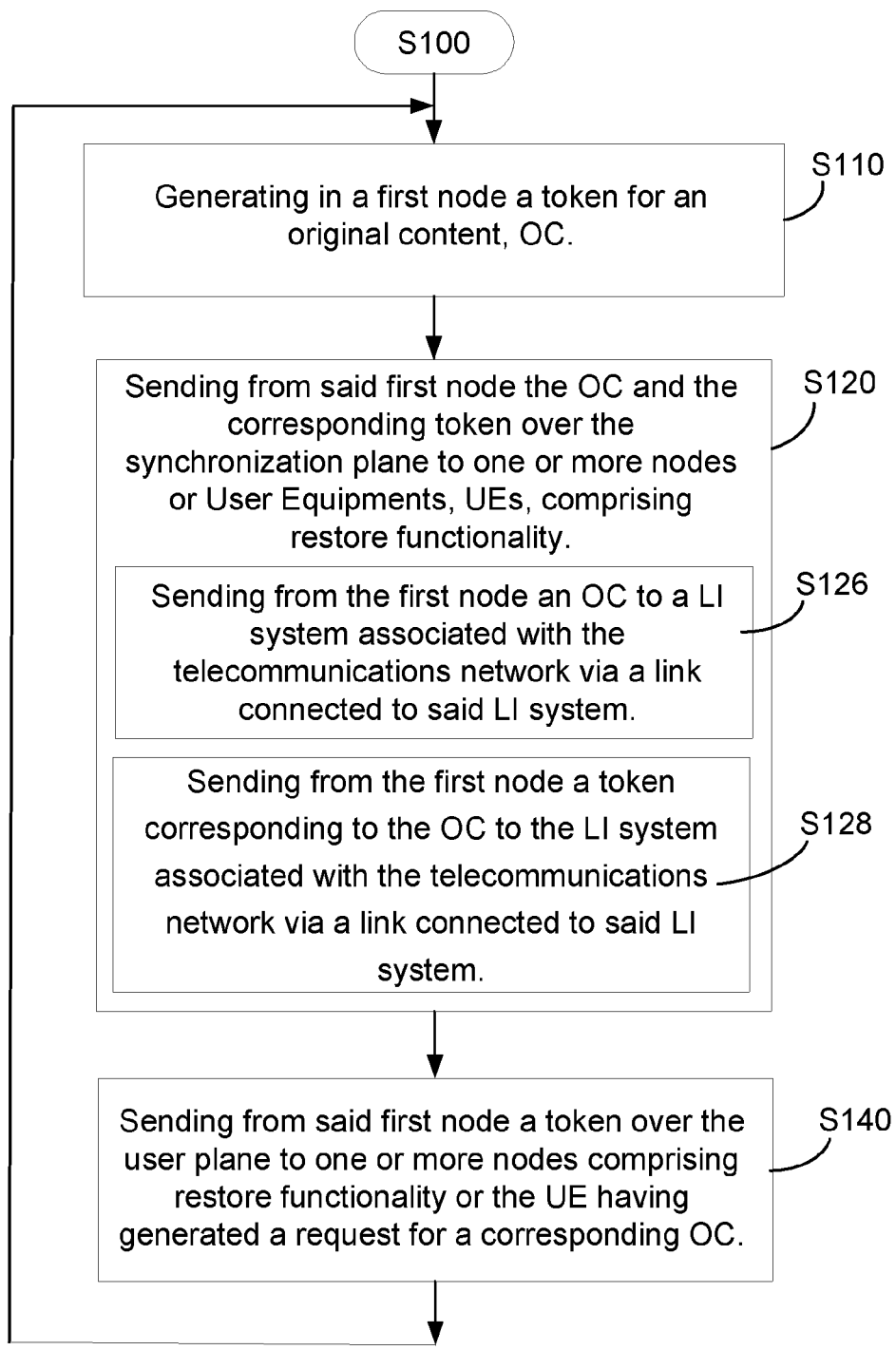
FIG. 14 is a flowchart illustrating an example of further one embodiment of the method performed in a node.

FIG. 14 is a flowchart illustrating another embodiment of a method in a node of a telecommunications network, e.g. a first node. Said method supports the provided method S100 and its embodiments. The method according to claim 17, the method comprising the step of:

S126:—sending an OC to a LI system associated with the telecommunications network via a link connected to said LI system;

S128:—sending a token corresponding to the OC to the LI system associated with the telecommunications network via a link connected to said LI system.

The node may be adapted to send the OC and the corresponding token over a synchronization plane to a LI system associated with the telecommunications network.

Alternatively, the node may be adapted to send an OC and/or the token to a LI system associated with the telecommunications network via a link connected to said LI system.

The node, e.g. the first node, in the telecommunications network may be implemented by means of a computer program comprising computer program code which, when run in a processor of a node, causes the node to perform embodiments of the method, S100, comprising the steps:

S110:—generating a token for an original content, OC;

S120;—sending the OC and the corresponding token over a synchronization plane to one or more nodes or User Equipments, UEs, comprising restore functionality;

S140:—sending the token over a user plane to one or more nodes comprising restore functionality or to the UE having generated a request for a corresponding OC.

According to further embodiments of the computer program, said program may comprise computer program code which, when run in a processor of a system, causes the system to perform the method steps of the different described embodiments of the method S100.

It is further provided a computer program product comprising a computer program for performing the steps of the method S200 and its embodiments performed in a node, e.g. a first node, and a computer readable means on which the computer program is stored.

It is further provided carrier comprising a computer program for performing the steps of the method S200 and its embodiments performed in a node, e.g. a first node, wherein the carrier is one of an electronic signal, optical signal, radio signal or a computer readable means or medium on which the computer program is stored.

The above described embodiments may be implemented in digital electronically circuitry, or in computer hardware, firmware, software, or in combinations of them. Means, devices, and apparatuses may be implemented in a computer program product tangibly embodied in a machine readable storage device for execution by a programmable processor; and method steps may be performed by a programmable processor executing a program of instructions to perform functions of the invention by operating on input data and generating output.

The embodiments may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. It is understood that any storage unit may comprise a different number of storage areas, and the illustrated number of data storage areas only is for illustrative purposes. One or several of the data storage areas may be physically separated from the other data storage areas, or may reside on the same physical media.

Generally, a processor will receive instructions and data from a storage device. A storage device is a computer readable storage medium or media, e.g. a read-only memory and/or a random access memory. Storage devices suitable for tangibly embodying computer program instructions and data include all forms of non-volatile memory, including by way of example semiconductor memory devices, such as EPROM (erasable programmable read only memory), EEPROM (electrically erasable programmable read only memory), and flash memory devices; magnetic disks such internal hard disks and removable disks; magneto-optical disks; and CD-ROM (Compact Disc Read-Only Memory), or DVD, or Blueray disks. Any of the foregoing may be supplemented by, or incorporated in, specially designed ASICs (Application Specific Integrated Circuits).

Thus, the herein above described method and embodiments of the method may be implemented and provided as a computer program comprising computer program code which, when run in a processor of a system, causes the system to perform the method steps of said method and embodiments.

Further, it may be provided a computer program product comprising a computer program for implementing the above described method and embodiments of the method and a computer readable means on which the computer program is stored.

Figure 15:
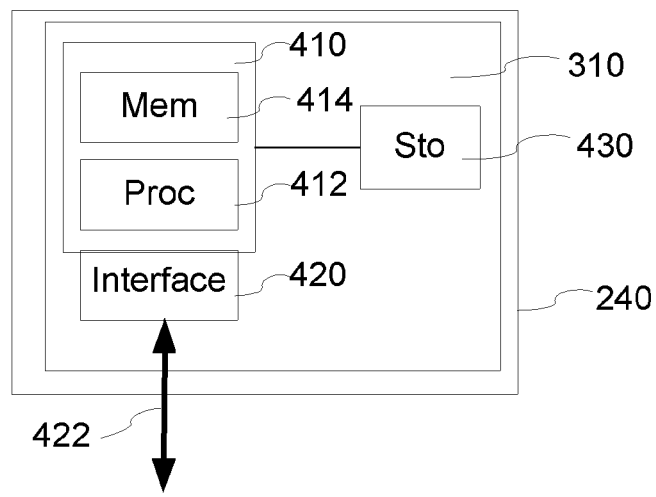
FIG. 15 is a block diagram illustrating one embodiment of a node.

FIG. 15 is a block diagram illustrating one example of a node, preferably a first node 240, comprising a tokenizer 310, in a communications network, e.g. wireless communications network or telecommunications network. The node comprises at least one processing circuitry 410 comprising a processor unit 412 and a memory storage 414. The node 240 further comprises an interface 420 for enabling input and output communication 422 with other nodes, etc. The node 240 may also comprise computer readable means or computer readable storage medium 430 on which the computer program is stored. Said means or medium 430 may be fixed in the node or removable.

It is understood that said may comprise a different number of computer readable means or computer readable storage medium 430, and the illustrated number of computer readable means or computer readable storage medium 430 only is for illustrative purposes. One or several of the computer readable means or computer readable storage medium 430 may be physically separated from the other computer readable means or computer readable storage medium 430, or may reside on the same physical media. Said processing circuitry 410 causes the node to perform the steps of the above described method S105 and embodiments thereof. Thus, the processing circuitry 410 of the node 240 is adapted to and operative to generate a token for an original content, OC, to send the OC and the corresponding token over a synchronization plane to one or more nodes or User Equipments, UEs, comprising restore functionality, and to send the token over a user plane to one or more nodes comprising restore functionality or to the UE having generated a request for a corresponding OC.

The node 240 may be adapted, e.g. by means of the processing circuitry 410, to generate a token for an original content, OC.

The node may further be adapted, e.g. by means of the processing circuitry 410, to send the OC and the corresponding token over a synchronization plane to one or more nodes or User Equipments, UEs, comprising restore functionality.

The node may further be adapted, e.g. by means of the processing circuitry 410, to send the token over a user plane to one or more nodes comprising restore functionality or to the UE having generated a request for a corresponding OC.

The above mentioned embodiments may be implemented as processing circuitry 410 and a computer program comprising computer program code which, when run in a processor circuitry of a node, causes the node to perform the method steps of the method S105:

S110:—generating a token for an original content, OC;
S120:—sending the OC and the corresponding token over a synchronization plane to one or more nodes or User Equipments, UEs, comprising restore functionality;
S140:—sending the token over a user plane to one or more nodes comprising restore functionality or to the UE having generated a request for a corresponding OC.

The computer program comprises computer program code which, when run in a processor circuitry of a node, causes the node to perform the different embodiments of the method S105.

It is further provided a computer program product comprising said computer program and a computer readable means on which the computer program is stored.

It is further provided a carrier containing the computer program, wherein the carrier is one of an electronic signal, optical signal, radio signal or computer readable storage medium.

Figure 16:
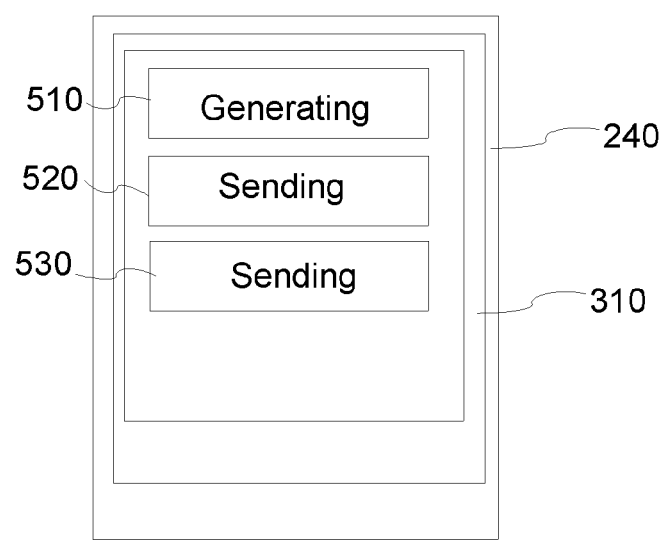
FIG. 16 is a block diagram illustrating another embodiment of a node.

FIG. 16 is a block diagram illustrating another example of a node, preferably a first node, in a communications network, e.g. wireless communications network or telecommunications network.

The above mentioned embodiments of the method S105 may be implemented as modules of a node 240 comprising a tokenizer 310, said modules causes the node to perform the method steps of the method S105. The node 240 may therefore comprise a first module 510 for generating a token for an original content, OC, a second module 520 for sending the OC and the corresponding token over a synchronization plane to one or more nodes or User Equipments, UEs, comprising restore functionality, and a third module 540 for sending the token over a user plane to one or more nodes comprising restore functionality or to the UE having generated a request for a corresponding OC.

A node 240 may comprise further modules for implementing the different embodiments of the method S105, said modules causes the node to perform the different embodiments of the method S105.

Figure 17:
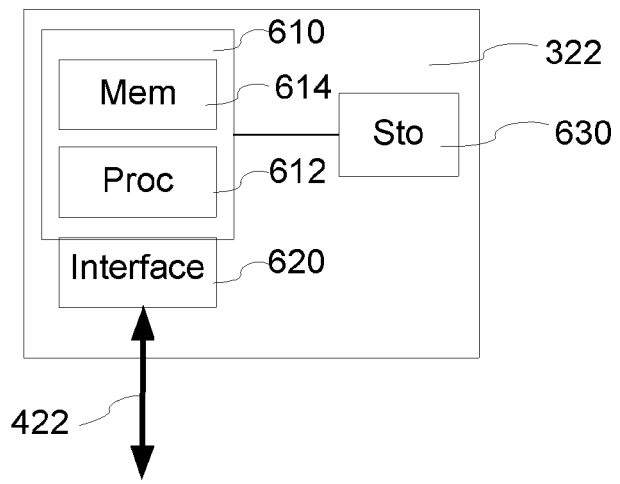
FIG. 17 is a block diagram illustrating one embodiment of a restore block.

FIG. 17 is a block diagram illustrating one example of a restore block 322 (322 in FIGS. 9, 10 and 11), e.g. in a LI system (110 in FIGS. 9, 10 and 11) comprising an IMDU (140 in FIGS. 9, 10 and 11). The LI system restore block 322 comprises at least one processing circuitry 610 comprising a processor unit 612 and a memory storage 614. The restore block 322 further comprises an interface 620 for enabling input and output communication 622 with other nodes and units, etc. The restore block may also comprise computer readable means or computer readable storage medium 630 on which the computer program is stored. Said means or medium 630 may be fixed in the node or removable.

It is understood that said may comprise a different number of computer readable means or computer readable storage medium 630, and the illustrated number of computer readable means or computer readable storage medium 630 only is for illustrative purposes. One or several of the computer readable means or computer readable storage medium 630 may be physically separated from the other computer readable means or computer readable storage medium 630, or may reside on the same physical media. Said processing circuitry 610 causes the node to perform the steps of the above described method S200 and embodiments thereof.

Thus, the processing circuitry 610 of the restore block is adapted to and operative to receive from a first node in a telecommunications network an original content, OC, and a corresponding token, to receive from a second node in the telecommunications network the token corresponding to the OC and to restore the OC by means of a restore functionality and the received token.

The restore block 322 may be adapted, e.g. by means of the processing circuitry 610, to receive from a first node in a telecommunications network an original content, OC, and a corresponding token.

The restore block 322 may further be adapted, e.g. by means of the processing circuitry 610, to receiving from a second node in the telecommunications network the token corresponding to the OC.

The restore block 322 may further be adapted, e.g. by means of the processing circuitry 610, to restore the OC by means of a restore functionality and the received token.

The above mentioned embodiments may be implemented as processing circuitry 610 and a computer program comprising computer program code which, when run in a processor circuitry of a node, causes the node to perform the method steps of the method S200:

S210:—receiving from a first node in a telecommunications network an original content, OC, and a corresponding token;

S220:—receiving from a second node in the telecommunications network the token corresponding to the OC;

S230:—restoring the OC by means of a restore functionality and the received token.

The computer program comprises computer program code which, when run in a processor circuitry of a node, causes the node to perform the different embodiments of the method S200.

It is further provided a computer program product comprising said computer program and a computer readable means on which the computer program is stored.

It is further provided a carrier containing the computer program, wherein the carrier is one of an electronic signal, optical signal, radio signal or computer readable storage medium.

Figure 18:
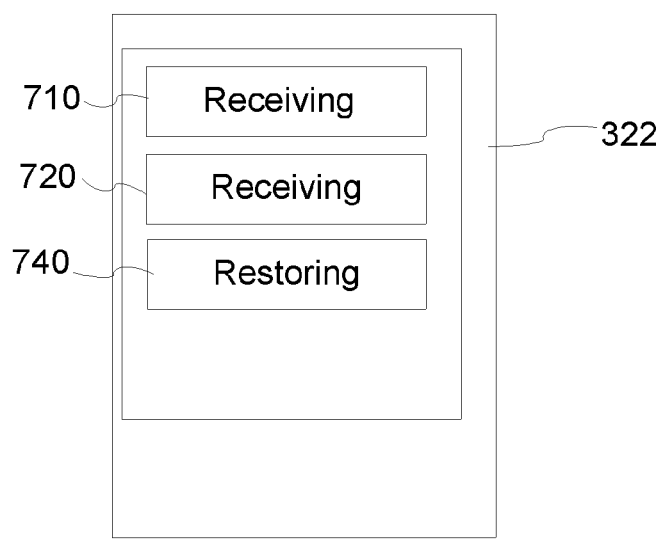
FIG. 18 is a block diagram illustrating another embodiment of a restore block.

FIG. 18 is a block diagram illustrating another example of a restore block 322.

The above mentioned embodiments of the method S200 may be implemented as modules of a restore block 322, said modules causes the node to perform the method steps of the method S200 and its embodiments. The restore block 322 may therefore comprise a first module 710 for receiving from a first node in a telecommunications network an original content, OC, and a corresponding token, a second module 720 for receiving from a second node in the telecommunications network the token corresponding to the OC, and a third module 730 for restoring the OC by means of a restore functionality and the received token.

A restore block 322 may comprise further modules for implementing the different embodiments of the method S200, said modules causes the node to perform the different embodiments of the method S200.

The entities and units described above with reference to FIGS. 9, 10, 11, 15 and 16 may be considered as logical units, and do not necessarily correspond to separate physical units. Thus, the person skilled in the art would appreciate that the units disclosed in the FIGS. 9, 10, 11, 15 and 16 may be implemented as physically integrated units, and/or physically separate units, and that the units are provided with appropriate processing circuits.

A number of embodiments of the present invention have been described. It will be understood that various modifications may be made without departing from the scope of the enclosed claims. Therefore, other implementations could be considered to be within the scope of the following claims.

REFERENCES

[1] 3GPP TS 33.106 "Lawful Interception requirements (Release 12)";
[2] 3GPP TS 33.107 "Lawful interception architecture and functions (Release 12)";
[3] 3GPP TS 33.108 "Handover interface for Lawful Interception" (Release 12).

ABBREVIATION LIST

SGW Serving Gateway
PGW Public Data Network Gateway
GGSN Gateway GPRS Support Node
GPRS General Packet Radio Packet Service
3GPP Third Generation Partnership Project
LTE Long Term Evolution
MME Mobility Management Entity
HI Handover Interface
HLR Home Location Register
HSS Home Subscriber Server
LI Lawful Intercept(-ion)
RAN Radio Access Network
DF Delivery Function
MF Mediation Function
LEMF Law Enforcement Monitoring Facility
ADMF Administration Function
EPC Evolved Packet Core CN Core Network, also denoted backhaul network, transport network
IP Internet Protocol
eNB base (transceiver) station in LTE systems
RNC Radio Network Controller
IAP Intercept Access Point
ICE Intercept Control Element
EPS Evolved Packet System

The invention claimed is:

1. A method in a telecommunications network, the method comprising:
generating in a first node a corresponding token for an original content (OC);
sending from said first node the OC and the corresponding token over a synchronization plane to one or more nodes or User Equipments (UEs) comprising restore functionality;
sending from said first node the token over a user plane to one or more nodes comprising restore functionality or to a UE having generated a request for a corresponding OC,
wherein said token enables the UE having generated the request or a node of the communication network to restore the OC by means of the token.

2. The method according to claim 1, wherein the telecommunications network is associated with a Lawful Intercept (LI) system, which comprises restore functionality, the step of sending from said first node the OC and the corresponding token over the synchronization plane involves:
sending from said first node the OC and the corresponding token over the synchronization plane to the LI system associated with the telecommunications network.

3. The method according to claim 2, further comprising:
receiving the token in the LI system comprising restore functionality;
restoring the OC;
sending the OC to a Law Enforcement Monitoring Facility.

4. The method according to claim 1, wherein the telecommunications network comprises a main content node comprising at least one OC, the method comprises the step of:
sending from the main content node an OC to a LI system associated with the telecommunications network via a link connected to said LI system.

5. The method according to claim 1, wherein the first node of the telecommunications network comprises at least one OC, the step of sending from said first node the OC and the corresponding token over the synchronization plane to one or more nodes or User Equipments(UEs) comprising restore functionality further involves:
sending from the first node an OC to a LI system associated with the telecommunications network via a link connected to said LI system.

6. The method according to claim 5, wherein the method further comprises:
sending from the first node a token corresponding to the OC to the LI system associated with the telecommunications network via a link connected to said LI system.

7. A system in a telecommunications network, the system comprising:
a first node adapted to: generate a corresponding token for an original content (OC), and to send the OC and the corresponding token over a synchronization plane to one or more of a second node comprising restore functionality adapted to store the token and the OC and a first user equipment (UE) comprising restore functionality adapted to store the token and the OC, wherein said first node is further adapted such that, in response to said first node receiving a request for the OC transmitted by said first UE or a second UE, said first node transmits over a user plane to one or more of said second node and said first UE the corresponding token but not the requested OC.

8. The system according to claim 7, wherein the first node is configured to send the OC and the corresponding token over a synchronization plane to a Lawful Intercept (LI) system associated with the telecommunications network, wherein the LI system comprises a restore functionality.

9. The system according to claim 8, wherein the LI system is adapted to receive the token, to restore the OC by means of the token, and to send the OC to a Law Enforcement Monitoring Facility.

10. The system according to claim 7, wherein the telecommunications network comprises a main content node comprising at least one OC, the system is adapted to send from the main content node an OC to a Lawful Intercept (LI) system associated with the telecommunications network via a link connected to said LI system.

11. The system according to claim 7, wherein the first node of the telecommunications network comprises at least one OC, said node is further adapted to send the OC and the corresponding token over a synchronization plane to one or more nodes or User Equipments (UEs) comprising restore functionality, said first node is further adapted to send an OC to a Lawful Intercept (LI) system associated with the telecommunications network via a link connected to said LI system.

12. The system according to claim 7, wherein the first node is further adapted to send a token corresponding to the OC to a Lawful Intercept (LI) system associated with the telecommunications network via a link connected to said LI system.

13. A method in a node of a telecommunications network, the method comprising:
generating a corresponding token for an original content (OC);
sending the OC and the corresponding token over a synchronization plane to one or more of a second node and a first user equipment (UE);
as a result of receiving a request for the OC transmitted by the first UE or a second UE, sending over a user plane to one or more of the second node and the first UE the corresponding token but not the OC.

14. The method according to claim 13, wherein the telecommunications network is associated with a Lawful Intercept (LI) system, which comprises restore functionality, the step of sending from said first node the OC and the corresponding token over the synchronization plane comprises:
sending the OC and the corresponding token over the synchronization plane to the LI system.

15. The method according to claim 13, wherein the method further comprises:
sending an OC to a Lawful Intercept (LI) system associated with the telecommunications network via a link connected to said LI system.

16. The method according to claim 15, the method further comprises:
sending a token corresponding to the OC to the LI system associated with the telecommunications network via a link connected to said LI system.

17. A computer program product comprising a non-transitory computer readable medium comprising computer program code which, when run in a processor of a node, causes the node to perform the method of claim 13.

18. The computer program product of claim 17, wherein the computer program code comprises instructions for sending the OC and the corresponding token over the synchronization plane to a Lawful Intercept (LI) system.

19. The computer program product of claim 17, wherein the computer program code comprises instructions for sending an OC to a Lawful Intercept (LI) system associated with the telecommunications network via a link connected to said LI system.

20. A first node of a telecommunications network, the first node being adapted to:
 generate a corresponding token for an original content (OC);
 send the OC and the corresponding token over a synchronization plane to one or more of a second node comprising restore functionality and a first user equipment comprising restore functionality; and
 as a result of receiving a request for the OC transmitted by the first UE or a second UE, send over a user plane to one or more of the second node and the first UE the corresponding token but not the OC.

21. The first node according to claim 20, the first node being adapted to send the OC and the corresponding token over a synchronization plane to a Lawful Intercept (LI) system associated with the telecommunications network.

22. The first node according to claim 20, the first node being adapted to send an OC to a Lawful Intercept (LI) system associated with the telecommunications network via a link connected to said LI system.

23. The first node according to claim 22, the first node being adapted to send a token corresponding to the OC to the LI system associated with the telecommunications network via a link connected to said LI system.

* * * * *